US012623641B2

(12) United States Patent
Takenaka et al.

(10) Patent No.: US 12,623,641 B2
(45) Date of Patent: May 12, 2026

(54) BRAKE PEDAL DEVICE

(71) Applicant: DENSO CORPORATION, Kariya-city (JP)

(72) Inventors: Kenichiro Takenaka, Kariya-city (JP); Yuki Matsunaga, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/910,622

(22) Filed: Oct. 9, 2024

(65) Prior Publication Data

US 2025/0033605 A1 Jan. 30, 2025

Related U.S. Application Data

(63) Continuation of application No. PCT/JP2023/012234, filed on Mar. 27, 2023.

(30) Foreign Application Priority Data

Apr. 29, 2022 (JP) ................................. 2022-075557

(51) Int. Cl.
*B60T 7/04* (2006.01)

(52) U.S. Cl.
CPC ..................................... *B60T 7/042* (2013.01)

(58) Field of Classification Search
CPC ............. B60T 7/042; G05G 1/38; G05G 1/44
See application file for complete search history.

(56) References Cited

FOREIGN PATENT DOCUMENTS

| JP | 2001253326 A | 9/2001 |
| JP | 2014021791 A | 2/2014 |

*Primary Examiner* — Thomas C Diaz
(74) *Attorney, Agent, or Firm* — Nixon & Vanderhye P.C.

(57) ABSTRACT

A housing is fixed to a vehicle. A shaft is rotatably mounted on the housing about a predetermined axis. A brake pedal is fixed to the shaft and operates around an axis of the shaft. A sensor device outputs a signal that detects a position of the shaft and the brake pedal relative to the housing, or a signal that detects a load applied to the brake pedal. A first fixing portion fixes a sensor component constituting at least a part of the sensor device to the housing or the brake pedal. A second fixing portion fixes the sensor component to the housing or the brake pedal using a fixing method different from that of the first fixing portion.

2 Claims, 21 Drawing Sheets

BRAKE PEDAL DEVICE

CROSS REFERENCE TO RELATED APPLICATIONS

This application is a continuation application of International Patent Application No. PCT/JP2023/012234 filed on Mar. 27, 2023, which designated the U.S. and based on and claims the benefits of priority of Japanese Patent Application No. 2022-075557 filed on Apr. 29, 2022. The entire disclosure of all of the above applications is incorporated herein by reference.

TECHNICAL FIELD

The present disclosure relates to a brake pedal device mounted on a vehicle.

BACKGROUND

Conventionally, a brake pedal device used in a brake-by-wire system is known. The brake-by-wire system is a system in which an electronic control unit (hereinafter referred to as "ECU") controls an operation of a brake mechanism and applies brakes to the vehicle based on a sensor signal transmitted to the ECU from a sensor device provided in the brake pedal device.

SUMMARY

An object of the present disclosure is to provide a brake pedal device that has redundancy in the fixing of a sensor component that constitutes at least a part of the sensor device, and is capable of preventing the sensor component from falling off due to the same cause.

According to one aspect of the present disclosure, a brake pedal device used in a brake-by-wire system in which a brake mechanism brakes a vehicle through drive control of an electronic control device mounted on the vehicle includes a housing, a shaft, a brake pedal, a sensor device, a first fixing portion, and a second fixing portion. The housing is directly or indirectly fixed to the vehicle. The shaft is provided to be rotatable around a predetermined axis relative to the housing within a predetermined angler range. The brake pedal is fixed to the shaft and operates within a predetermined angle range around the axis. The sensor device outputs a signal that detects the positions of the shaft and the brake pedal relative to the housing to the electronic control device. The first fixing portion fixes a sensor component constituting at least a part of the sensor device to the housing or the brake pedal. The second fixing portion fixes the sensor component and the housing or the brake pedal using a fixing method different from that of the first fixing portion.

DETAILED DESCRIPTION

Figure 1:
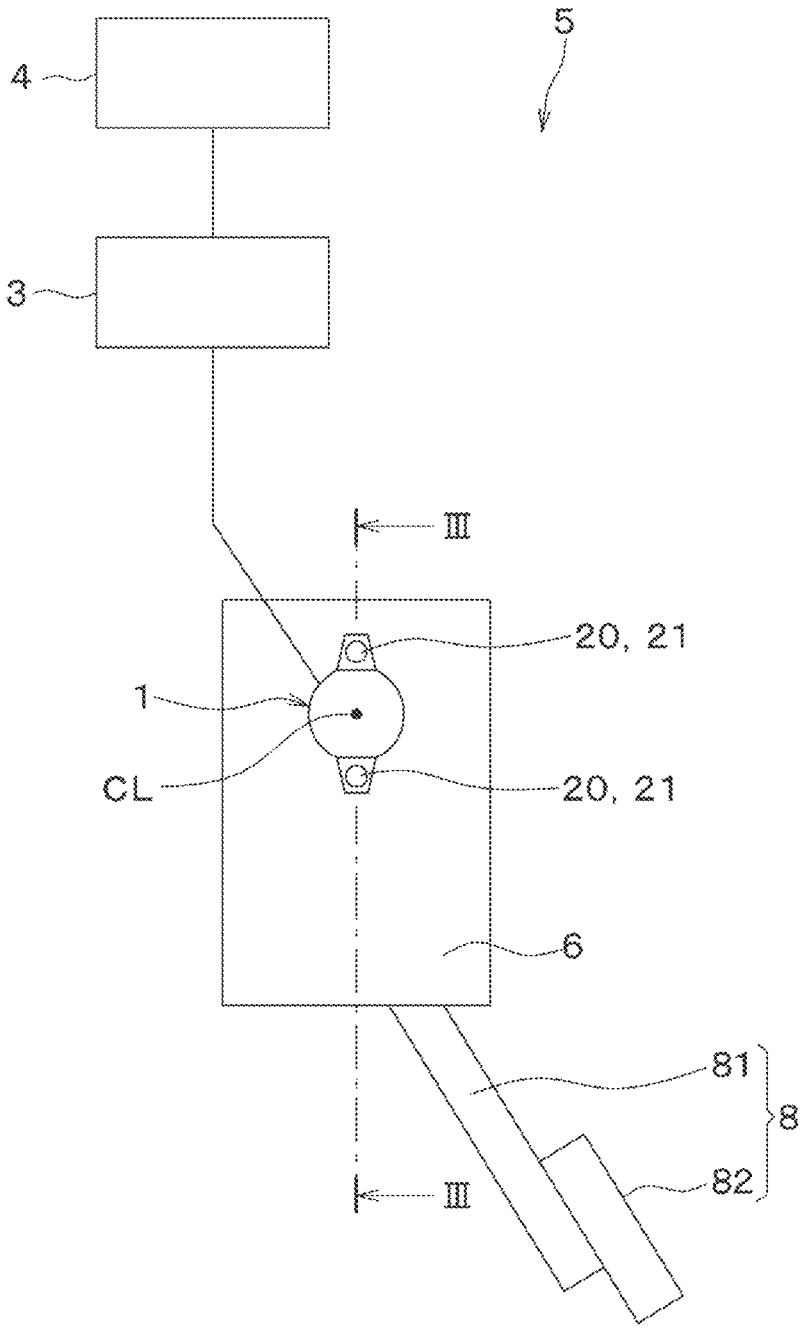
FIG. 1 is a schematic configuration diagram of a brake-by-wire system including a side view of a brake pedal device according to a first embodiment.

In an assumable example, a brake pedal device used in a brake-by-wire system is known. The brake-by-wire system is a system in which an electronic control unit (hereinafter referred to as "ECU") controls an operation of a brake mechanism and applies brakes to the vehicle based on a sensor signal transmitted to the ECU from a sensor device provided in the brake pedal device.

The brake pedal device includes a brake pedal that is depressed by a driver, a housing that rotatably supports the brake pedal, and a sensor device that detects a position of the brake pedal. In addition, the housing is called a bracket, and the sensor device is called a stroke sensor. The sensor device has a sensor main body that is positioned and fixed to the housing, and a sensor arm that is rotatable relative to the sensor main body and rotates in sync with the brake pedal. The sensor main body outputs an electrical signal according to a rotational position of the sensor arm. The sensor main body is positioned relative to the housing by two projections and fixed by two bolts. Specifically, the two bolts pass through holes provided in the housing and screw into threaded holes provided in the sensor main body, thereby fixing the housing and the sensor main body together.

However, in the brake pedal device, the sensor main body of the sensor device is fixed to the housing by the same fixing method using two bolts. In general, it is known that when a bolt is used for fastening, if a tightening torque is small, the bolt may become loose due to vibration or the like. Therefore, when the two bolts come loose due to the same cause such as vibration, the sensor device (i.e., the sensor main body and the sensor arm) may fall off the housing, making it impossible to detect the position of the brake pedal. Specifically, even if the first of the two bolts comes loose, the sensor device may continue to be secured by the second bolt, but there is a risk that the second bolt may come loose for the same reason that caused the first bolt to come loose. Therefore, in the brake pedal device, the sensor main body of the sensor device is fixed to the housing in the same manner, so even if it is fixed in multiple places, there is a risk that the fixing function will be lost due to the same cause, and the sensor device will fall off from the housing.

An object of the present disclosure is to provide a brake pedal device that has redundancy in the fixing of a sensor component that constitutes at least a part of the sensor device, and is capable of preventing the sensor component from falling off due to the same cause.

According to one aspect of the present disclosure, a brake pedal device used in a brake-by-wire system in which a brake mechanism brakes a vehicle through drive control of an electronic control device mounted on the vehicle includes a housing, a shaft, a brake pedal, a sensor device, a first fixing portion, and a second fixing portion. The housing is directly or indirectly fixed to the vehicle. The shaft is provided to be rotatable around a predetermined axis relative to the housing within a predetermined angler range. The brake pedal is fixed to the shaft and operates within a predetermined angle range around the axis. The sensor device outputs a signal that detects the positions of the shaft and the brake pedal relative to the housing to the electronic control device. The first fixing portion fixes a sensor component constituting at least a part of the sensor device to the housing or the brake pedal. The second fixing portion fixes the sensor component and the housing or the brake pedal using a fixing method different from that of the first fixing portion.

According to this configuration, since different fixing methods are adopted for the first fixing portion and the second fixing portion, it is possible to prevent the fixing function of the first fixing portion and the fixing function of the second fixing portion from failing simultaneously due to the same cause. In other words, even if one of the first fixing portion and the second fixing portion loses its fixing function for some reason, the other fixing portion will not lose its fixing function, and the sensor component will continue to be fixed to the housing or the brake pedal by the other fixing portion. Therefore, this brake pedal device has redundancy for the fixing of the sensor component, and prevents the sensor component from falling off due to the same cause, thereby enabling the sensor device to continue outputting the correct detection value. Therefore, this brake pedal device can improve the reliability of the detection value output from the sensor device.

However, in the brake pedal device used in the brake-by-wire system, when a sensor component falls off and the sensor device no longer outputs correct detection values to the electronic control device, there is a risk that this will cause a disruption to the braking of the vehicle by the electronic control device. In contrast, one aspect of the present disclosure is to provide redundancy in fixing the sensor components, thereby preventing the sensor device from failing and enabling the sensor device to continue outputting correct detection values to the electronic control device. Therefore, the brake pedal device can improve the safety of vehicle braking in the brake-by-wire system.

In this specification, "fixed" refers to a state in which the sensor components etc. cannot be easily removed from the housing etc. without a special force. Examples of such fixing methods include press fitting, snap fitting, caulking, adhesion, welding, bolt fastening, screw fastening, and the like.

Embodiments of the present disclosure will now be described with reference to the drawings. Parts that are identical or equivalent to each other in the following embodiments are assigned the same reference numerals and will not be described.

FIRST EMBODIMENT

A first embodiment will be described with reference to the drawings. As shown in FIG. 1, a brake pedal device 2 of the first embodiment is used in a brake-by-wire system 5 that applies brakes to a vehicle. The brake-by-wire system 5 is a system in which a brake mechanism 4 applies brakes to the vehicle under a drive control of an electronic control unit (hereinafter, referred to as "ECU 3") mounted on the vehicle. The ECU 3 is an abbreviation for Electronic Control Unit. In particular, the brake pedal device 2 of the first embodiment is used in a complete brake-by-wire system 5. The complete brake-by-wire system 5 is a system in which the components of the brake mechanism 4 and the brake pedal are not mechanically connected, and the ECU 3 drives and controls the brake mechanism 4 based on the output signal of the sensor device 1 provided in the brake pedal device 2 to brake the vehicle. The component of the brake mechanism 4 is, for example, a master cylinder.

First, a schematic configuration of the brake pedal device 2 and the brake-by-wire system 5 will be described.

Figure 2:
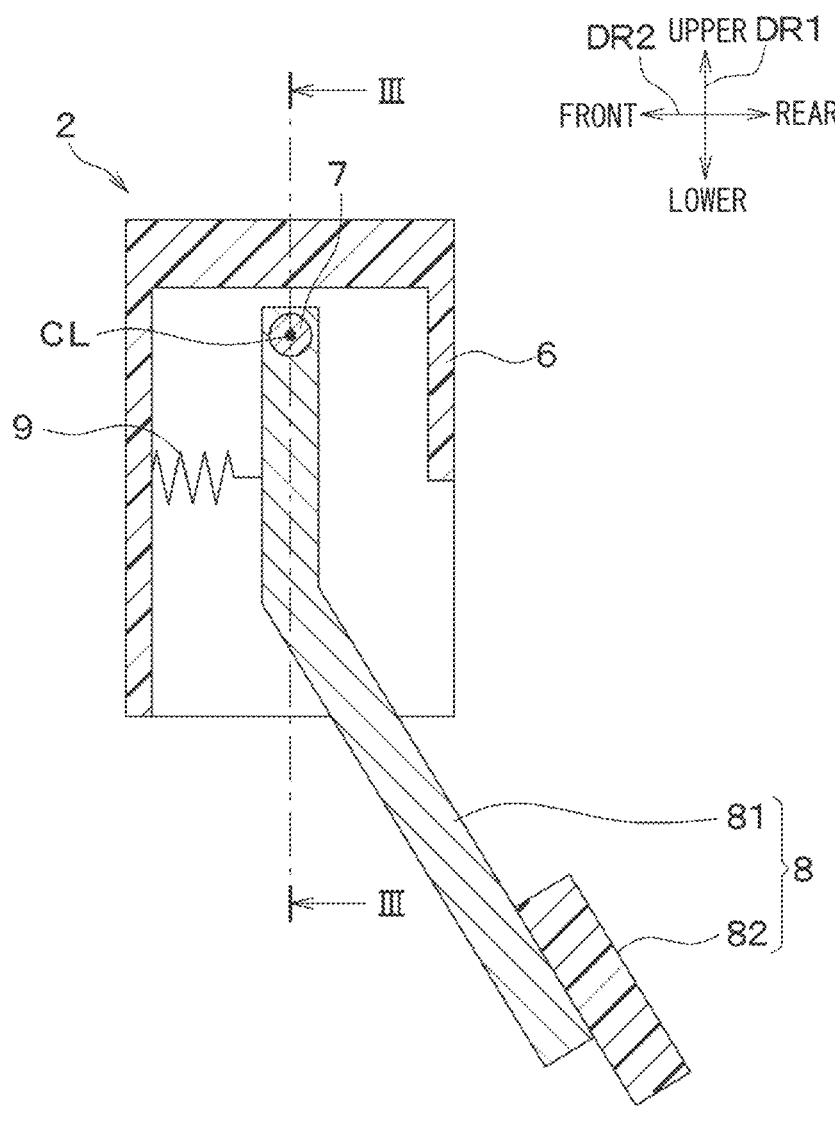
FIG. 2 is a cross-sectional view perpendicular to an axis of a shaft in the brake pedal device.
Figure 3:
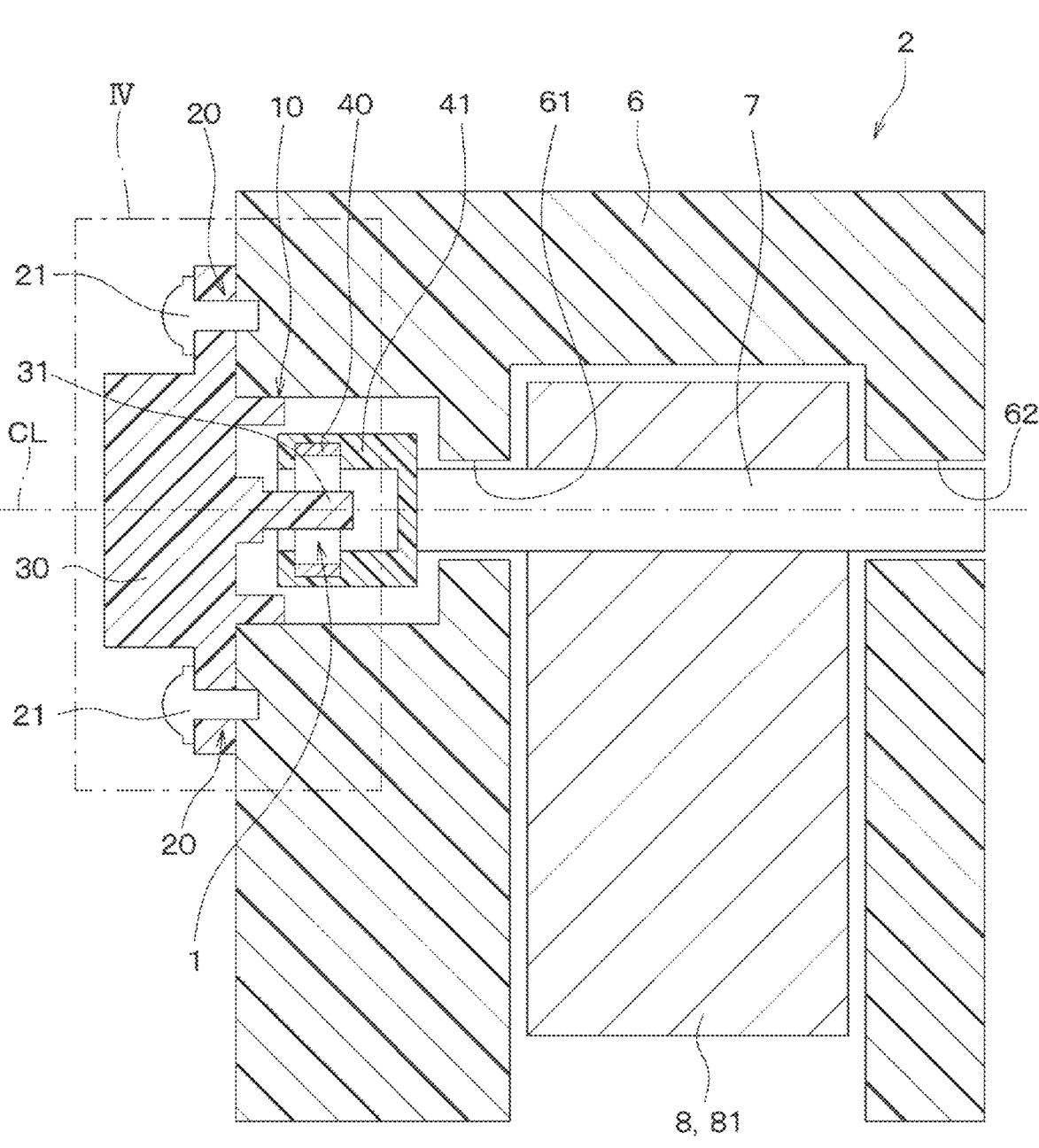
FIG. 3 is a cross-sectional view taken along a line III-III in FIGS. 1 and 2.

As shown in FIGS. 1 to 3, the brake pedal device 2 includes a housing 6, a shaft 7, a brake pedal 8, a reaction force generating mechanism 9, a sensor device 1, a press-fit portion as a first fixing portion 10, and a screw fixing portion as a second fixing portion 20.

The housing 6 is directly fixed to a vehicle body by bolts or the like (not shown), or is indirectly fixed to the vehicle body via a base member or the like (not shown). Specifically, the housing 6 is fixed to a dash panel or a floor inside the vehicle compartment. Inside the housing 6, bearings 61 and 62 are provided for rotatably supporting the shaft 7.

The shaft 7 is formed in a rod shape, and is supported by the bearings 61 and 62 provided in the housing 6. The shaft 7 is rotatable relative to the housing 6 within a predetermined angle range in a circumferential direction of a circle centered on its own axis CL (hereinafter referred to as "around the axis"). Therefore, the shaft 7 is provided rotatably around a predetermined axis relative to the housing 6.

The brake pedal 8 has a pedal arm 81 and a pedal pad 82. One end of the pedal arm 81 is fixed to the shaft 7 and the pedal pad 82 is provided at the other end. The pedal pad 82 is a portion that is stepped on by the driver's foot. When the driver depresses the brake pedal 8, the brake pedal 8 rotates in the forward and reverse directions within a predetermined angle range about the axis of the shaft 7.

The reaction force generating mechanism 9 is composed of, for example, a spring, an actuator, and the like. The reaction force generating mechanism 9 is a mechanism that generates a reaction force against the driver's depressing force applied to the brake pedal 8. By providing the reaction force generating mechanism 9, the brake pedal device 2 is able to obtain a reaction force similar to that obtained when the brake pedal 8 is connected to a master cylinder (i.e., when a reaction force is obtained by hydraulic pressure) even if the mechanical connection between the brake pedal 8 and a conventional master cylinder is eliminated.

The sensor device 1 detects the position (specifically, the rotation angle) of a detection object relative to the housing 6, the detection object being a shaft 7 or a brake pedal 8. As the sensor device 1, various types of sensor devices can be adopted. For example, the sensor device 1 may be a non-contact sensor such as an inductive sensor, a magnetic sensor, or an optical sensor, or a contact sensor such as a load sensor or a rotary encoder. The electrical signal output from the sensor device 1 is transmitted to the ECU 3.

The ECU 3 includes a microcontroller having a processor for performing control processing and arithmetic processing, and a storage unit, such as a ROM and a RAM, for storing programs and data. The controller also includes peripheral circuits for these components. The storage unit includes non-transitory tangible storage media. Based on programs stored in the storage unit, the ECU 3 performs various types of control processing and arithmetic processing to control the operation of devices connected to output ports of the ECU 3. Specifically, the ECU 3 detects an accurate pedal operation amount (i.e., an operation amount of the brake pedal 8) based on an electric signal transmitted from the sensor device 1 etc., and controls the operation of the brake mechanism 4. The number of ECUs 3 is not limited to one, and the operation of the brake mechanism 4 may be controlled by a plurality of ECUs 3.

As the brake mechanism 4, various mechanisms can be adopted. For example, the brake mechanism 4 may be an electric brake that applies brakes to each wheel by driving an electric motor in response to a command from the ECU 3 to press brake pads against a disc brake rotor. Alternatively, for example, the brake mechanism 4 may be configured to increase the hydraulic pressure of the brake fluid by operating a master cylinder or a hydraulic pump, thereby driving wheel cylinders arranged on each wheel and operating the brake pads. In addition, the brake mechanism 4 is also capable of performing normal control, ABS control, VSC control, etc., in response to a control signal from the ECU 3. ABS stands for Anti-lock Braking System, and VSC stands for Vehicle Stability Control.

Next, the sensor device 1 will be described. As described above, the sensor device 1 can employ various types. In the first embodiment, an example in which a magnetic sensor is used as the sensor device 1 will be described.

As shown in FIG. 3, the magnetic sensor as an example of the sensor device 1 has a sensor main body 30 as a first sensor component and a magnetic circuit unit 40 as a second sensor component.

The sensor main body 30 is fixed to the housing 6. The method of fixing the sensor main body 30 to the housing 6 will be described later. A magnetic detection portion 31 composed of a Hall IC or a magnetic resistance element is provided in the center of the sensor main body 30. The magnetic detection portion 31 is molded integrally with the resin that forms the sensor main body 30. The magnetic detection portion 31 outputs a signal according to the intensity of the magnetic flux density penetrating its magnetic sensing surface.

On the other hand, the magnetic circuit unit 40 is constituted by a magnet and a yoke, and is formed in a cylindrical shape so as to surround a radially outer area of the magnetic detection portion 31. The magnetic circuit unit 40 configures a magnetic circuit in which magnetic flux flies inside the cylindrical shape in a direction (hereinafter referred to as "axial direction") intersecting the direction in which the axis CL of the shaft 7 extends. The magnetic circuit unit 40 is fixed to a tip of the shaft 7 in a state where it is molded with the resin that constitutes a resin fixing portion 41, and rotates in synchronization with a rotation of the shaft 7. As the magnetic circuit unit 40 rotates, the direction of the magnetic field inside the cylindrical shape changes. An intensity of the magnetic flux density that penetrates the magnetic sensing surface of the magnetic detection portion 31 provided inside the magnetic circuit unit 40 changes. Therefore, the magnetic detection portion 31 of the sensor main body 30 is capable of outputting an electric signal according to the strength of the magnetic flux density that changes with the rotation of the shaft 7.

Incidentally, in the brake pedal device 2 used in the brake-by-wire system 5, when a sensor component of the sensor device 1 falls off and a correct detection value is no longer output from the sensor device 1 to the ECU 3, there is a risk that this will cause a disruption to the braking of the vehicle by the ECU 3. In contrast, the brake pedal device 2 of the first embodiment has redundancy in the fixation between the sensor main body 30, which is the first sensor component of the sensor device 1, and the housing 6, and is configured to prevent the sensor device 1 from malfunctioning.

The brake pedal device 2 of the first embodiment includes the first fixing portion 10 and the second fixing portion 20 that fix the sensor main body 30 of the sensor device 1 to the housing 6. The first fixing portion 10 and the second fixing portion 20 fix the sensor main body 30 to the housing 6 using different fixing methods. By adopting the different fixing methods using the first fixing portion 10 and the second fixing portion 20, this prevents the fixing function of the first fixing portion 10 and the fixing function of the second fixing portion 20 from failing at the same time due to the same cause. The first fixing portion 10 and the second fixing portion 20 can be fixed by various methods such as press fitting, snap fitting, crimping, adhesion, welding, bolt fastening, screw fastening, etc.

In the first embodiment, an example in which press fitting is used as the first fixing portion 10 and a tapping screw 21 is used as the second fixing portion 20 will be described. That is, in the first embodiment, the first fixing portion 10 is a portion (i.e., a press-fit portion) that fixes the sensor main body 30 and the housing 6 by press-fitting. On the other hand, the second fixing portion 20 is a portion where the sensor main body 30 and the housing 6 are fixed to each other by a tapping screw 21 (i.e., a screw fixing portion).

Figure 4:
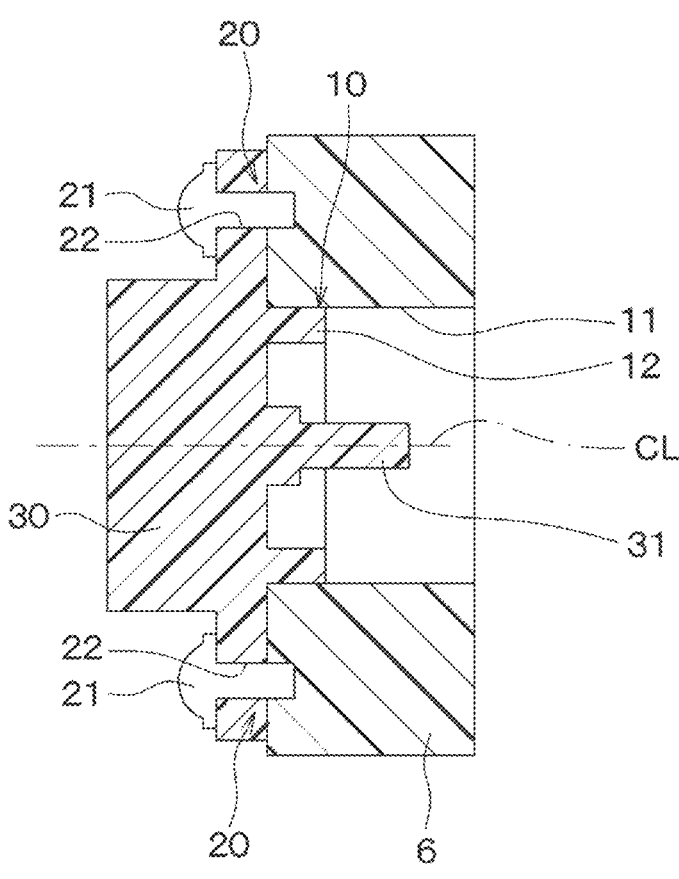
FIG. 4 is a cross-sectional view showing only a sensor main body and a housing in a portion IV of FIG. 3.
Figure 5:
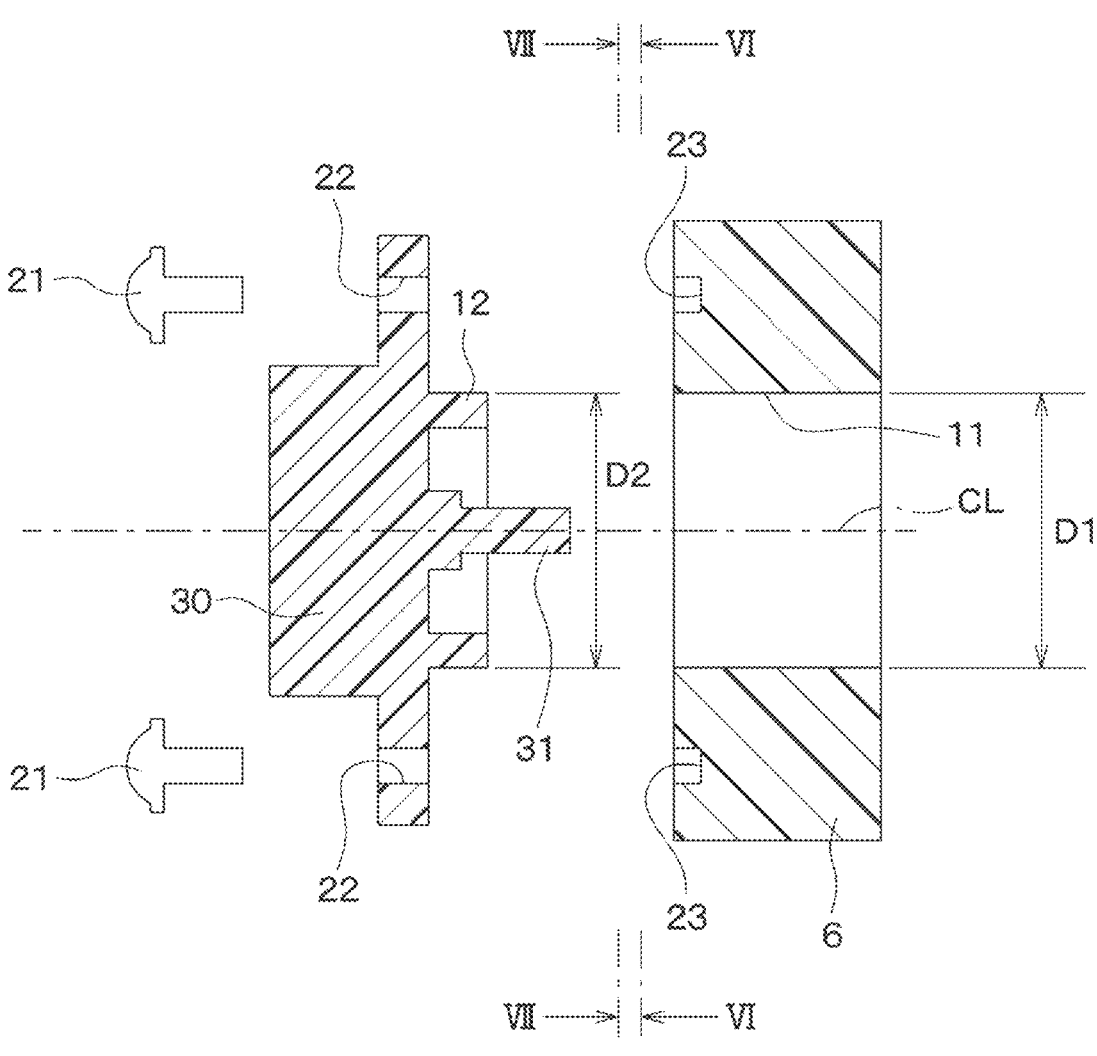
FIG. 5 is an exploded view of the sensor main body and housing shown in FIG. 4.
Figure 6:
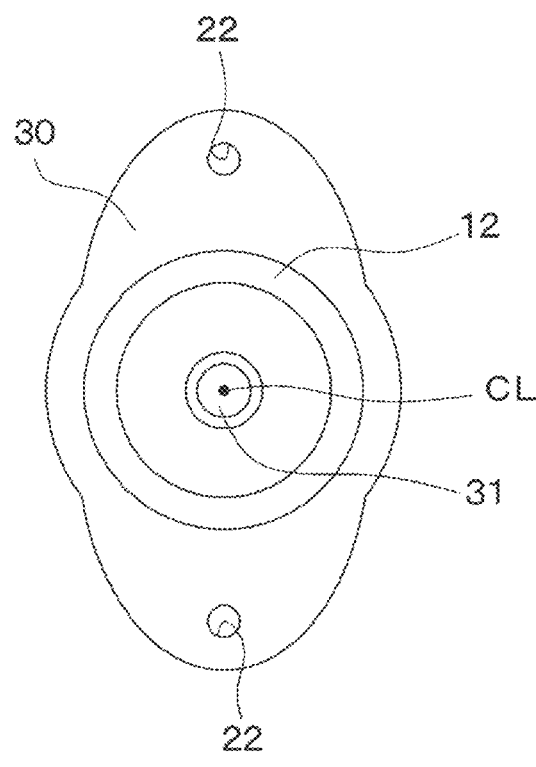
FIG. 6 is a view from an arrow direction of a line VI-VI in FIG. 5.
Figure 7:
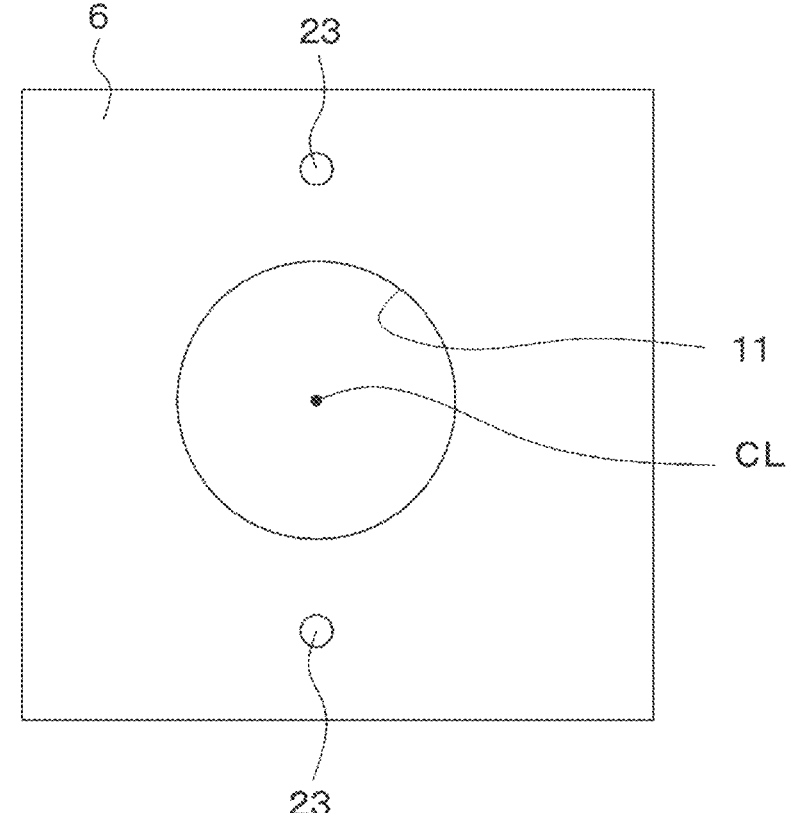
FIG. 7 is a view from an arrow direction of a line VII-VII in FIG. 5.

FIG. 4 is a cross-sectional view showing only the sensor main body 30 and the housing 6 in a portion IV of FIG. 3, and FIG. 5 is an exploded view of the sensor main body 30 and the housing 6. FIG. 6 is a view showing the sensor main body 30 from an arrow direction of a line VI-VI in FIG. 5, and FIG. 7 is a view showing a part of the housing 6 from an arrow direction of a line VII-VII in FIG. 5.

In FIGS. 4 and 5, the axis CL of the shaft 7 is indicated by a dashed line, and in FIGS. 4 and 5, the axis CL of the shaft 7 is indicated by a dot. In FIGS. 4 to 7, the axis CL of the shaft 7 and the center (that is, the center of the magnetic detection portion 31) of the sensor detection portion of the sensor main body 30 coincide with each other.

As shown in FIGS. 4 to 7, a tapping screw 21 serving as the second fixing portion 20 is inserted through an insertion hole 22 provided in the sensor main body 30 and screwed into a pilot hole 23 provided in the housing 6. When the tip of the tapping screw 21 is sharp, the pilot hole 23 in the housing 6 may be omitted.

On the other hand, the press-fit portion serving as the first fixing portion 10 is configured to fix the sensor main body 30 to the housing 6 by pressing in a spigot structure in which the outer wall of a cylindrical fitting protrusion 12 provided on the sensor main body 30 fits into the inner wall of a cylindrical hole portion 11 provided in the housing 6. Specifically, as shown in FIG. 5, an outer diameter D2 of the fitting protrusion 12 provided on the sensor main body 30 is slightly larger than an inner diameter D1 of the hole portion 11 provided on the housing 6. Therefore, the inner wall of the hole portion 11 provided in the housing 6 and the outer wall of the fitting protrusion 12 provided in the sensor main body 30 are press-fitted into each other.

The press-fit portion as the first fixing portion 10 is configured to fix the sensor main body 30 and the housing 6 together so that the axis CL of the shaft 7 and the sensor detection center coincide with each other. Specifically, the center of the cylindrical hole portion 11 provided in the housing 6, the center of the cylindrical fitting protrusion 12 provided in the sensor main body 30, and the axis CL of the shaft 7 are aligned. Therefore, by positioning the center of the sensor detection portion of the sensor main body 30 (i.e., the center of the magnetic detection portion 31) with high precision relative to the axis CL of the shaft 7, the detection accuracy of the sensor device 1 can be improved.

In this specification, the alignment of the center of the hole portion 11 provided in the housing 6, the center of the fitting protrusion 12 provided in the sensor main body 30, and the axis CL of the shaft 7 includes not only a perfect alignment but also a state in which they are slightly misaligned within the range of manufacturing tolerances.

Here, for comparison with the fixing method of the sensor main body 30 and the housing 6 in the first embodiment, the fixing method of the sensor main body 30 and the housing 6 provided in the brake pedal device 2 of a comparative example will be described with reference to FIGS. 8 to 11.

Figure 8:
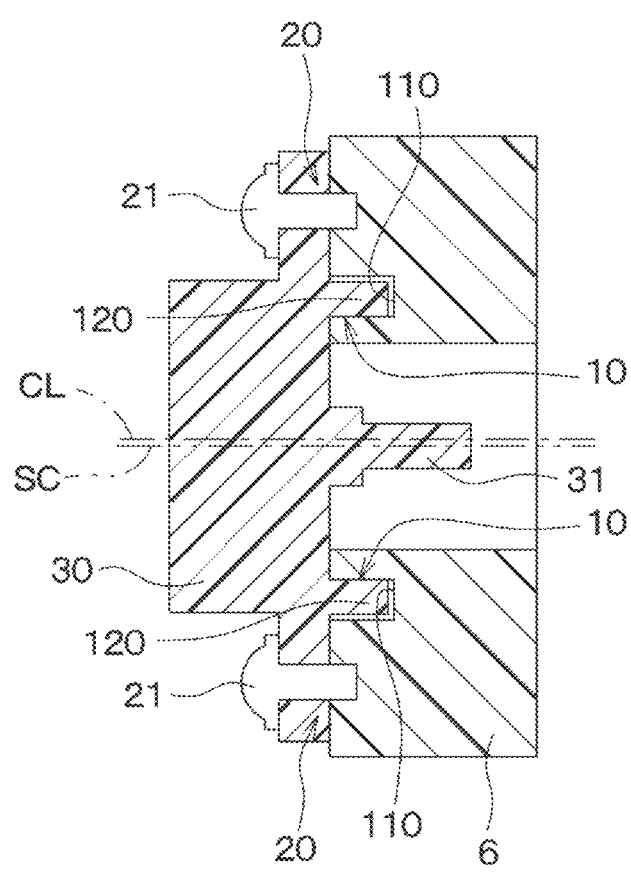
FIG. 8 is a cross-sectional view showing only a sensor main body and a housing in a brake pedal device of a comparative example.
Figure 9:
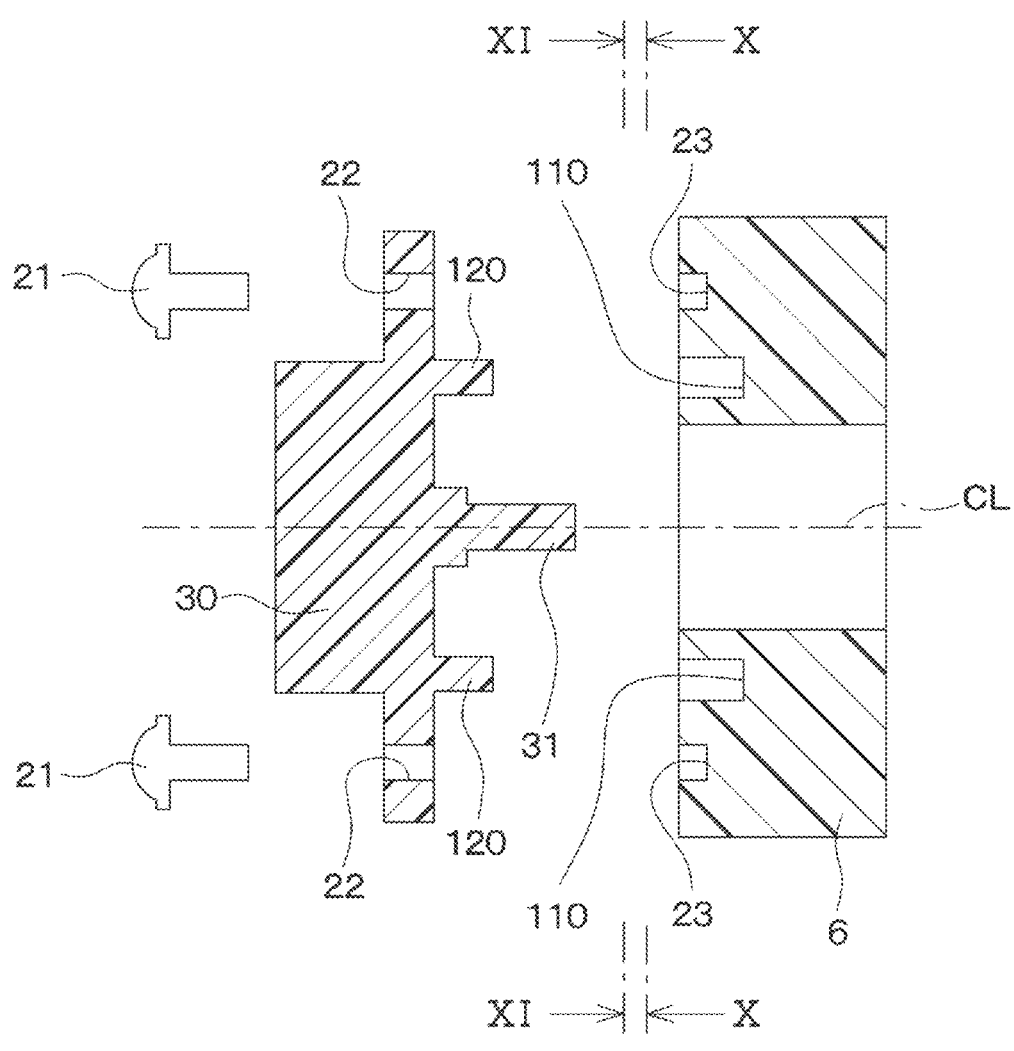
FIG. 9 is an exploded view of the sensor main body and housing shown in FIG. 8.
Figure 10:
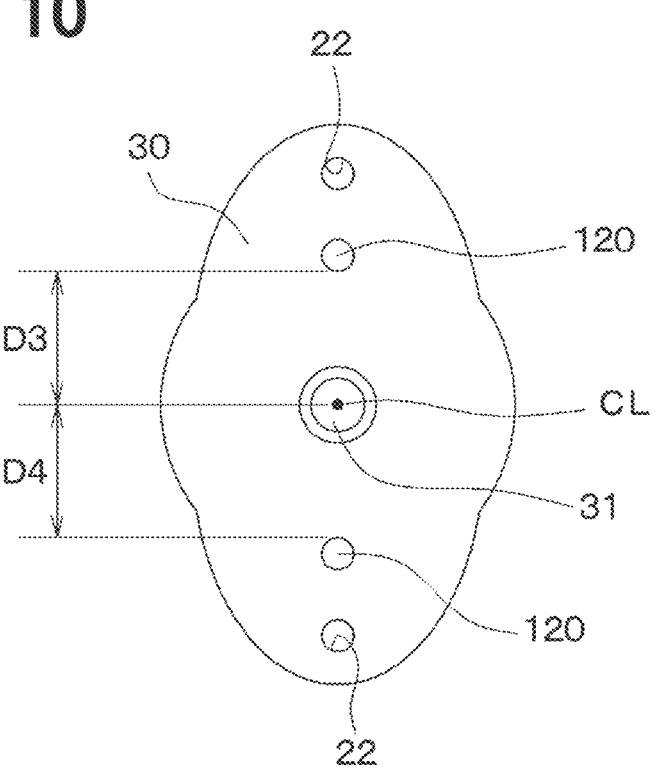
FIG. 10 is a view from an arrow direction of a line X-X in FIG. 9.

In the comparative example as well, press fitting is used as the first fixing portion 10 and a tapping screw 21 is used as the second fixing portion 20. FIG. 8 is a cross-sectional view showing only the sensor main body 30 and the housing 6 provided in the brake pedal device 2 of the comparative example, and FIG. 9 is an exploded view of the sensor main body 30 and the housing 6. FIG. 10 is a view showing the sensor main body 30 from an arrow direction of a line X-X in FIG. 9, and FIG. 11 is a view showing a part of the housing 6 from an arrow direction of a line XI-XI in FIG. 9.

Figure 11:
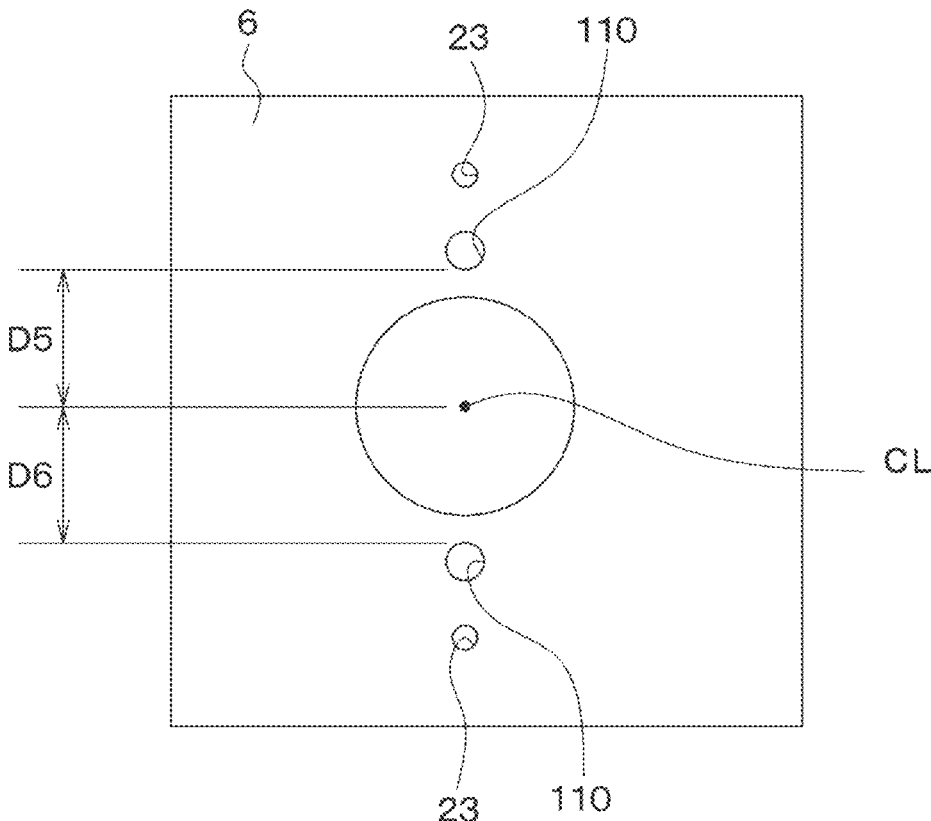
FIG. 11 is a view from an arrow direction of a line XI-XI in FIG. 9.
Figure 12:
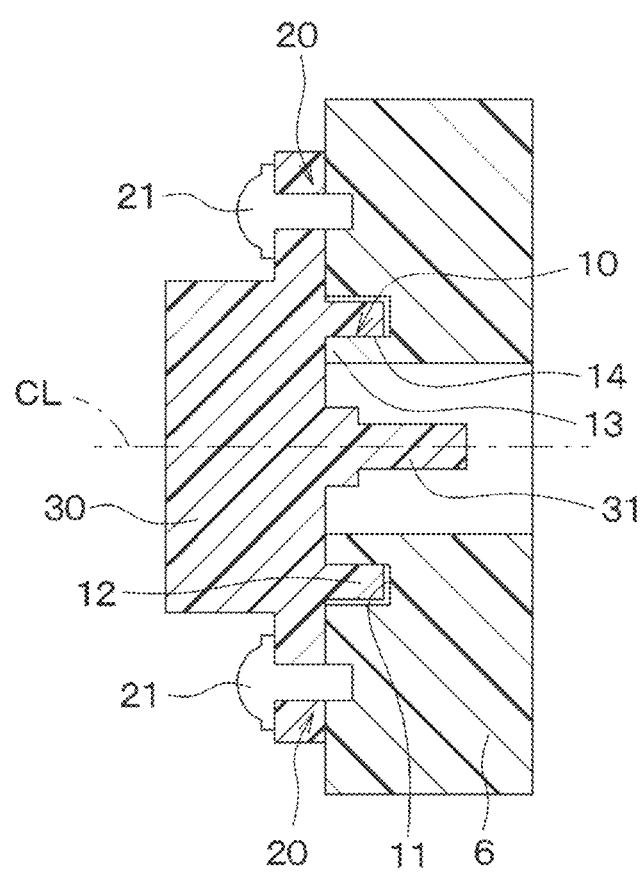
FIG. 12 is a cross-sectional view showing only a sensor main body and a housing in a brake pedal device according to a second embodiment.

In FIGS. 8 and 9, the axis CL of the shaft 7 is indicated by a dashed line, and in FIGS. 10 and 11, the axis CL of the shaft 7 is indicated by a dot. In FIG. 8, the sensor detection center SC of the sensor main body 30 (i.e., the center of the magnetic detection portion 31) is indicated by a two-dot chain line. In FIG. 8, the axis CL of the shaft 7 and the sensor detection center SC of the sensor main body 30 are offset from each other.

As shown in FIGS. 8 to 11, in the comparative example, a spigot structure in which the fitting protrusion 120 of the sensor main body 30 is pressed into the hole portion 110 of the housing 6 that constitutes the first fixing portion 10 is positioned radially offset from the axis CL of the shaft 7. Therefore, in the comparative example, at least two sets of spigot structures for press-fitting the fitting protrusions 120 of the sensor main body 30 into the hole portions 110 of the housing 6 are required to position the sensor main body 30. For each of the two sets of spigot structures, the positional tolerance of the distance between the ideal central axis (i.e., a position where the axis CL of the shaft 7 is disposed) and the spigot structure is set. Specifically, as shown in FIG. 10, the positional tolerance of the distances D3 and D4 between the fitting protrusion 120 of the sensor main body 30 and the ideal central axis is set. As shown in FIG. 11, the positional tolerance of the distances D5 and D6 between the two hole portions 110 of the housing 6 and the ideal central axis is set. In this case, since the press-fit is performed using two sets of spigot structures, the positional tolerance of each of the two sets of spigot structures must be set to a large value. Therefore, as shown in FIG. 8, in the comparative example, the positional deviation between the sensor detection center SC of the sensor main body 30 and the axis CL of the shaft 7 becomes large, and there is a concern that the detection accuracy of the sensor device 1 will deteriorate.

In contrast to such comparative example, in the first embodiment, as shown in FIGS. 4 to 7, the center of the spigot structure formed by the hole portion 11 of the housing 6 that constitutes the first fixing portion 10 and the fitting protrusion 12 of the sensor main body 30 coincides with the axis CL of the shaft 7. Therefore, it is possible to position the sensor detection center of the sensor main body 30 (i.e., the center of the magnetic detection portion 31) with high accuracy relative to the axis CL of the shaft 7.

The brake pedal device 2 of the first embodiment described above provides the following advantages.

(1) The brake pedal device 2 of the first embodiment is configured such that the sensor main body 30 as a first sensor component constituting the sensor device 1 is fixed to the housing 6 by the first fixing portion 10 and the second fixing portion 20, which employ different fixing methods.

This prevents the fixing function of the first fixing portion 10 and the fixing function of the second fixing portion 20 from failing simultaneously due to the same cause. In other words, even if one of the first fixing portion 10 and the second fixing portion 20 loses its fixing function for some reason, the other fixing portion will not lose its fixing function, and the sensor main body 30 will continue to be fixed to the housing 6 by the other fixing portion. Therefore, this brake pedal device 2 has redundancy for the fixing of the sensor main body 30, and prevents the sensor main body 30 from falling off due to the same cause, thereby enabling the sensor device 1 to continue outputting the correct detection value. Therefore, this brake pedal device 2 can improve the reliability of the detection value output from the sensor device 1.

Incidentally, in the brake pedal device 2 used in the brake-by-wire system 5, when the sensor main body 30 falls off from the housing 6, and a correct detection value is no longer output from the sensor device 1 to the ECU 3, there is a risk that this will cause a disruption to the braking of the vehicle by the ECU 3. In contrast, the brake pedal device 2 of the first embodiment has redundancy for the fixing of the sensor main body 30, thereby preventing the sensor device 1 from malfunctioning and enabling the sensor device 1 to continue outputting correct detection values to the ECU 3. Therefore, the brake pedal device 2 can improve the safety of vehicle braking in the brake-by-wire system 5.

(2) The brake pedal device 2 of the first embodiment is used in a complete brake-by-wire system 5 in which the components of the brake mechanism 4 that brakes the vehicle are not mechanically connected to the brake pedal 8.

As a result, the brake pedal device 2 has redundancy for the fixing of the sensor main body 30, thereby preventing the sensor device 1 from malfunctioning, and improving the safety of vehicle braking in the complete brake-by-wire system 5.

(3) In the first embodiment, the first fixing portion 10 fixes the sensor main body 30 as the first sensor component and the housing 6 by press-fitting. The second fixing portion 20 fixes the sensor main body 30 as a first sensor component and the housing 6 with a screw (specifically, a tapping screw 21).

According to this configuration, the brake pedal device 2 mounted on a vehicle is generally subjected to various environmental stresses such as vibrations transmitted from the vehicle side, unintended application of external forces, stress concentration on the fixing portions, unintended exposure to water or temperature changes, etc. In contrast, in the first embodiment, even if the press-fit portion serving as the first fixing portion 10 becomes loose due to such various environmental stresses, the sensor main body 30 and the housing 6 continue to be fixed by the tapping screw 21 serving as the second fixing portion 20. Conversely, even if the tapping screw 21 serving as the second fixing portion 20 becomes loose due to vibration or the like, the sensor main body 30 and the housing 6 continue to be fixed by the press-fit portion serving as the first fixing portion 10. Therefore, the brake pedal device 2 of the first embodiment prevents the sensor main body 30 from falling off, thereby enabling the sensor device 1 to continue outputting the correct detection values to the ECU 3, thereby improving the safety of vehicle braking in the brake-by-wire system 5.

(4) In the first embodiment, the first fixing portion 10 is configured such that the outer wall of the fitting protrusion 12 provided on the sensor main body 30 fits inside the hole portion 11 provided on the housing 6 (i.e. press-fitting with a spigot structure). The first fixing portion 10 is configured to fix the sensor main body 30 to the housing 6 by press-fitting with such a spigot structure so that the axis CL of the shaft 7 and the sensor detection center coincide with each other. Therefore, the center of the hole portion 11 provided in the housing 6, the center of the fitting protrusion 12 provided in the sensor main body 30, and the axis CL of the shaft 7 are aligned.

According to this configuration, the positioning of the sensor main body 30 can be achieved with only one pair of the spigot structure between the hole portion 11 provided in the housing 6 and the fitting protrusion 12 provided on the sensor main body 30. When setting the positional tolerance of the distance between the center of the spigot structure (i.e., the center of the hole portion 11 of the housing 6 and the fitting protrusion 12 of the sensor main body 30) and the axis CL of the shaft 7 for one pair of the spigot structure, it is possible to set the positional tolerance smaller than in the comparative example described above. As a result, the positional tolerance between the sensor detection center of the sensor main body 30 and the axis CL of the shaft 7 can be reduced, making it possible to position the sensor detection center of the sensor main body 30 with respect to the axis CL of the shaft 7 with high precision. Therefore, the detection accuracy of the sensor device 1 can be improved.

SECOND EMBODIMENT

A second embodiment will be described. The second embodiment is a modification of the first embodiment, and changes partially the configuration of the first fixing portion 10 compared to the first embodiment.

As shown in FIGS. 12 to 15, in the second embodiment as well, the sensor main body 30 and the housing 6 of the sensor device 1 are fixed by the first fixing portion 10 and the second fixing portion 20. The press-fitting is used as the first fixing portion 10, and a tapping screw 21 is used as the second fixing portion 20.

Figure 13:
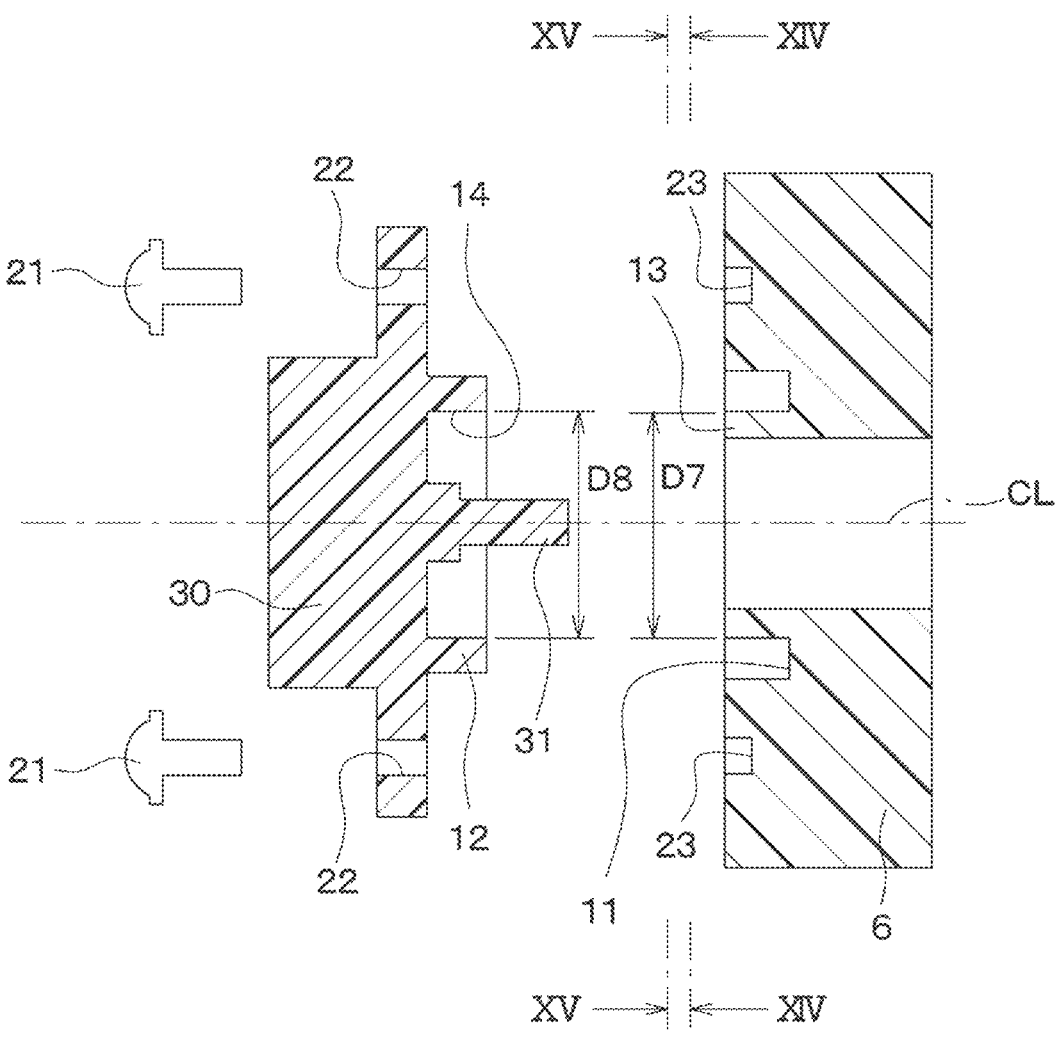
FIG. 13 is an exploded view of the sensor main body and housing shown in FIG. 12.

The press-fit portion serving as the first fixing portion 10 is configured to fix the sensor main body 30 to the housing 6 by pressing in a spigot structure in which the inner wall of a cylindrical fitting hole portion 14 provided on the sensor main body 30 fits into the outside of a cylindrical fitting protrusion 13 provided in the housing 6. Specifically, as shown in FIG. 13, the inner diameter D8 of the fitting hole portion 14 provided in the sensor main body 30 is slightly smaller than the outer diameter D7 of the fitting protrusion 13 provided in the housing 6. Therefore, the outer wall of the fitting protrusion 13 provided on the housing 6 and the inner wall of the fitting hole portion 14 provided in the sensor main body 30 are press-fitted into each other.

Figure 14:
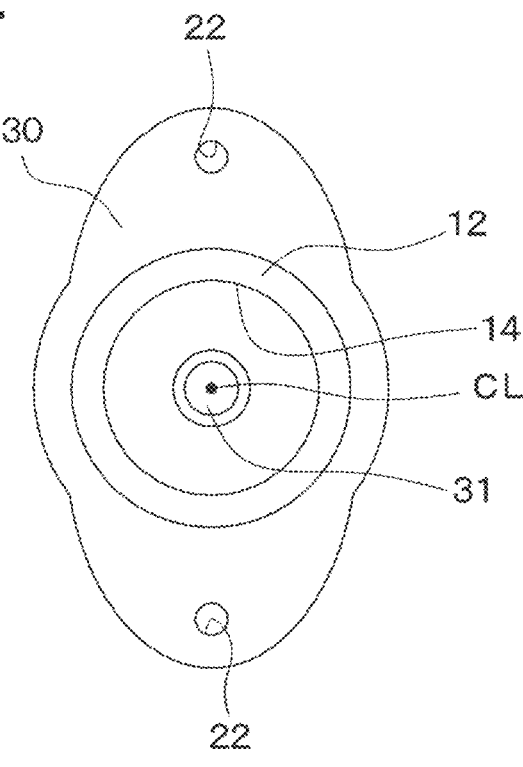
FIG. 14 is a view from an arrow direction of a line XIV-XIV in FIG. 13.
Figure 15:
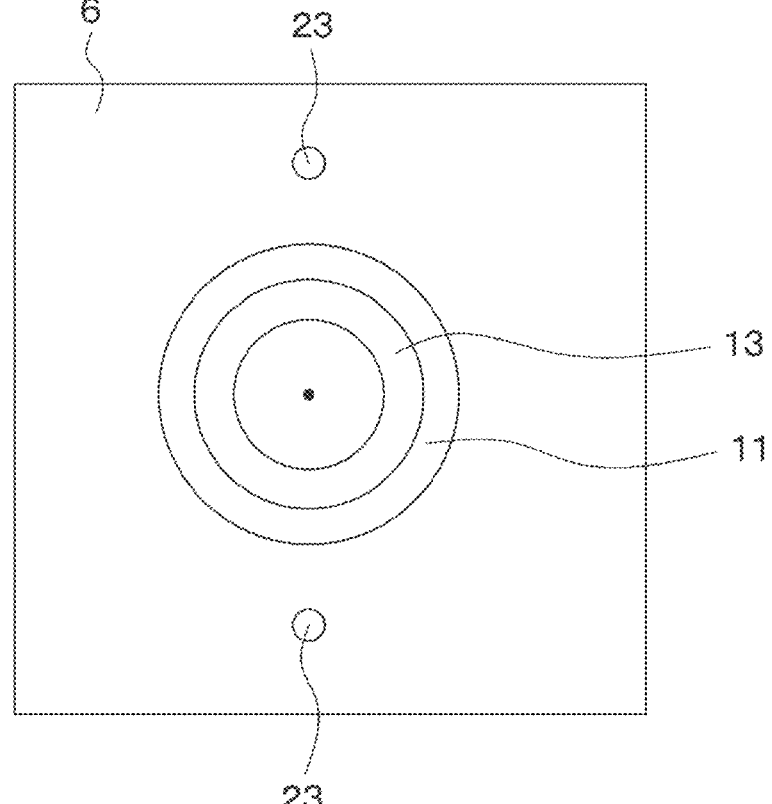
FIG. 15 is a view from an arrow direction of a line XV-XV in FIG. 13.

The press-fit portion as the first fixing portion 10 is configured to fix the sensor main body 30 and the housing 6 together so that the axis CL of the shaft 7 and the sensor detection center coincide with each other. Specifically, as shown in FIGS. 14 and 15, the center of the cylindrical fitting protrusion 13 provided on the housing 6, the center of the cylindrical fitting hole portion 14 provided in the sensor main body 30, and the axis CL of the shaft 7 are aligned. Therefore, it is possible to position the center of the sensor detection portion of the sensor main body 30 with high accuracy relative to the axis CL of the shaft 7, thereby improving the detection accuracy of the sensor device 1.

In the second embodiment, as in the first embodiment, the first fixing portion 10 is configured to fix the sensor main body 30 to the housing 6 by pressing in a spigot structure in which the fitting protrusion 12 provided on the sensor main body 30 fits into the hole portion 11 provided in the housing 6.

The second embodiment described above can thus have the effect similar to that of the first embodiment.

THIRD EMBODIMENT

A third embodiment will be described. In the third embodiment, the configurations of the first fixing portion 10 and the second fixing portion 20 are changed from the first embodiment. Since the other parts are similar to that in the first embodiment, only the different parts from the first embodiment will be described.

Figure 16:
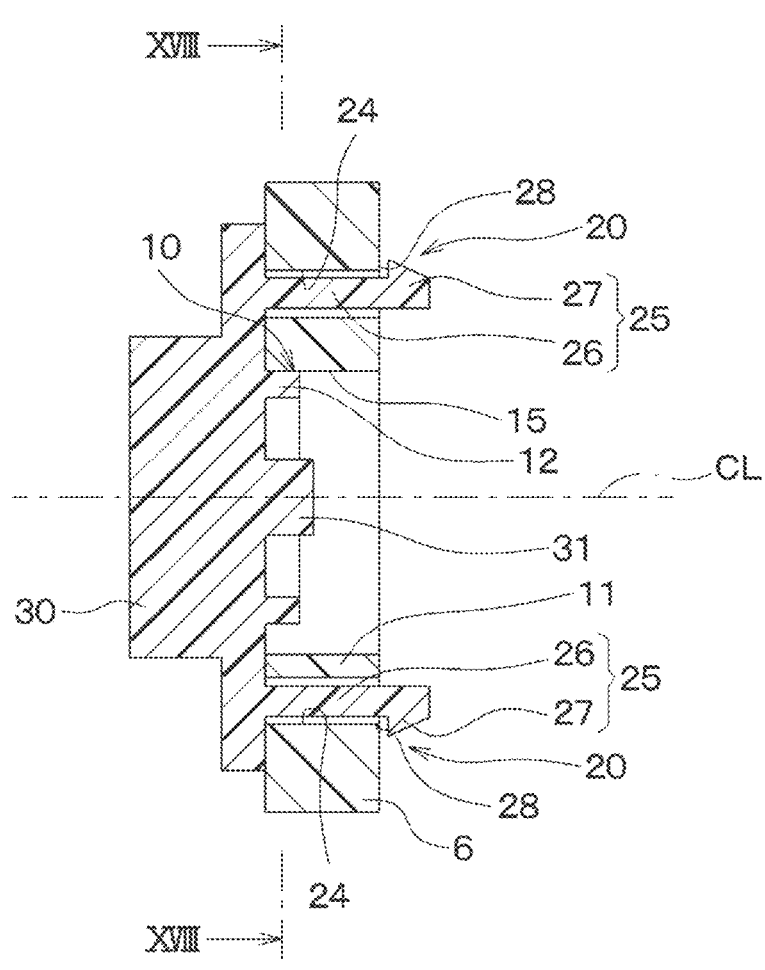
FIG. 16 is a cross-sectional view showing only a sensor device and a housing in a brake pedal device according to a third embodiment.
Figure 17:
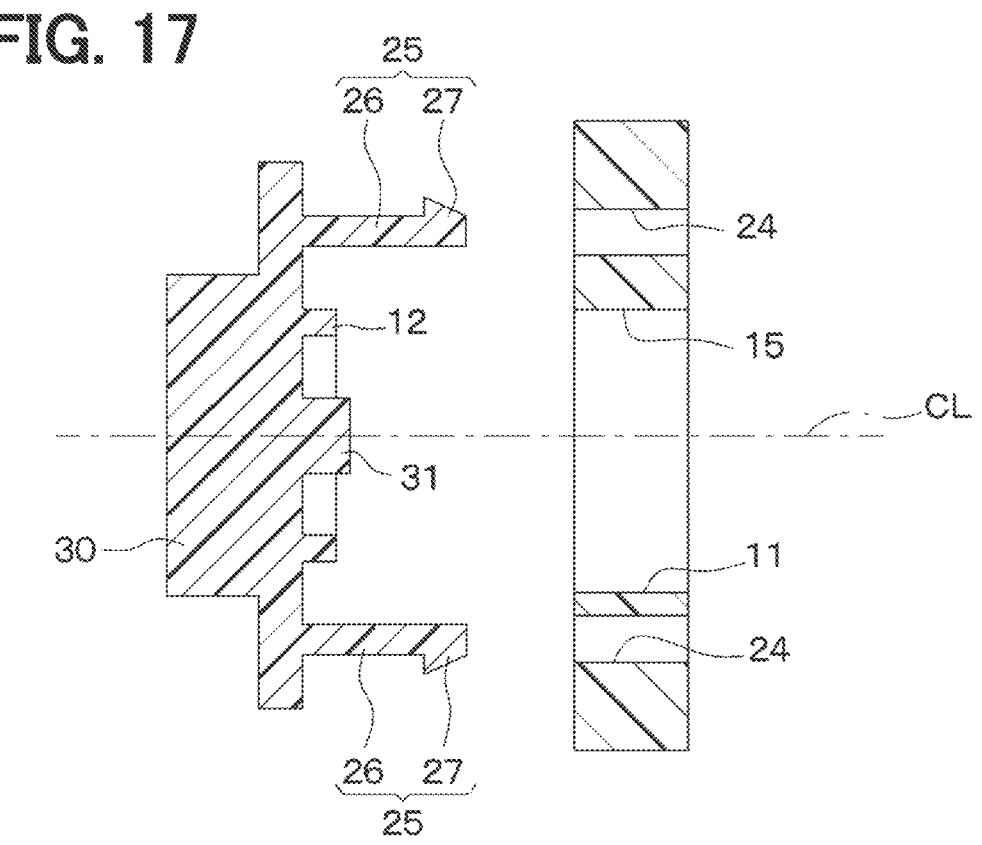
FIG. 17 is an exploded view of the sensor device and housing shown in FIG. 16.
Figure 18:
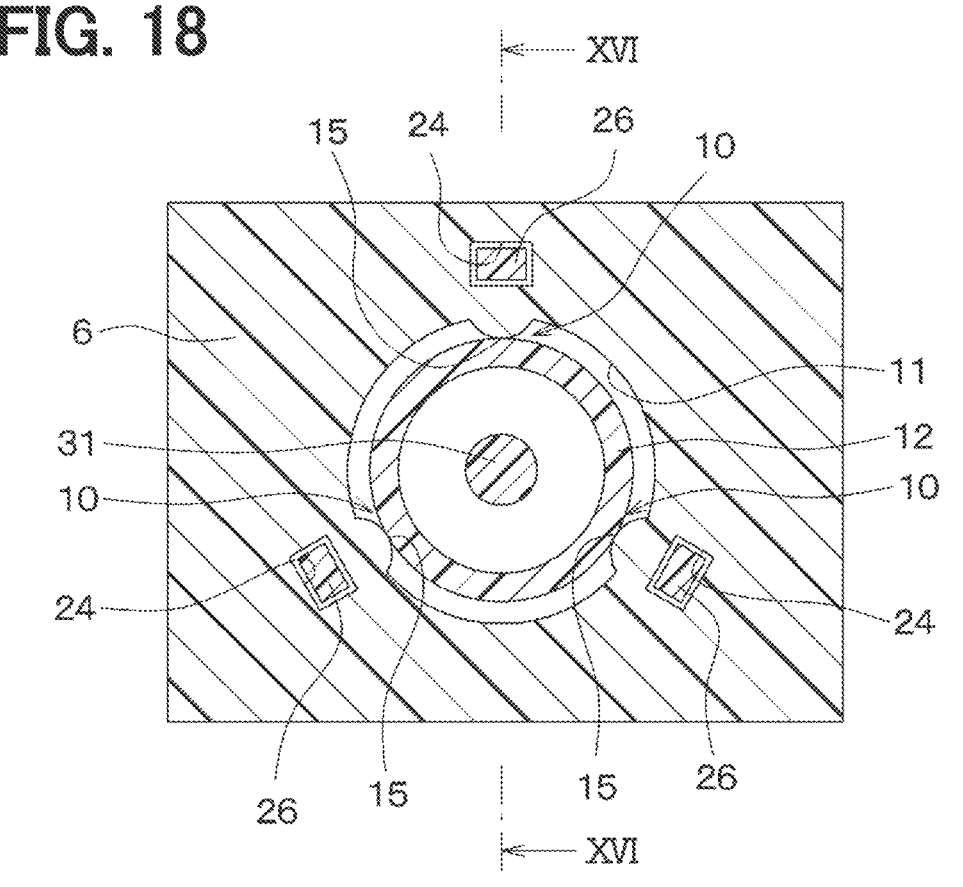
FIG. 18 is a cross-sectional view taken along a line XVIII-XVIII in FIG. 16.

As shown in FIGS. 16 to 18, in the third embodiment as well, the sensor main body 30 and the housing 6 of the sensor device 1 are fixed by the first fixing portion 10 and the second fixing portion 20. The press-fitting is adopted for the first fixing portion 10, and a snap fit is adopted for the second fixing portion 20. That is, in the third embodiment, the first fixing portion 10 is a portion (i.e., a press-fit portion) that fixes the sensor main body 30 and the housing 6 by press-fitting. On the other hand, the second fixing portion 20 is a portion that fixes the sensor main body 30 and the housing 6 by snap-fitting (i.e., a snap-fit fixing portion).

The first fixing portion 10 fixes the sensor main body 30 and the housing 6 by partial press-fitting in which multiple protrusions 15 protruding radially from a portion of the inner wall of the hole portion 11 provided in the housing 6 and the outer wall of the fitting protrusion 12 provided on the sensor main body 30 fit together. At this time, the first fixing portion 10 fixes the sensor main body 30 and the housing 6 so that the sensor detection center of the sensor main body 30 coincides with the axis CL of the shaft 7. Although FIG. 18 shows three protrusions 15 protruding radially from a portion of the inner wall of the hole portion 11 formed in the housing 6, the number of protrusions 15 is not limited to this number and can be set arbitrarily.

On the other hand, the second fixing portion 20 is composed of a second hole portion 24 provided in the housing 6 and a snap fit portion 25 extending from the sensor main body 30. The snap fit portion 25 has a shaft part 26 that extends from the sensor main body 30 and passes through the second hole portion 24, and a claw part 27 provided at the tip of the shaft part 26. The second fixing portion 20 fixes the sensor main body 30 to the housing 6 by engaging a claw part 27 of the snap-fit portion 25 with the opening part 28 of the second hole portion 24 provided in the housing 6 on the opposite side to the sensor main body 30. Here, an insertion direction in which the snap fit portion 25 constituting the second fixing portion 20 is inserted into the second hole portion 24 of the housing 6 is aligned with a press-fitting direction in which the fitting protrusion 12 constituting the first fixing portion 10 is pressed into the inside of the multiple protrusions 15 provided on the inner wall of the hole portion 11 of the housing 6. Therefore, when fixing the sensor main body 30 and the housing 6, it is possible to simultaneously perform the press-fitting and fixing of the first fixing portion 10 and the snap-fitting and fixing of the second fixing portion 20.

The brake pedal device 2 of the third embodiment described above can achieve the following effects in addition to the effects similar to those of the first embodiment.

(1) In the third embodiment, the first fixing portion 10 fixes the sensor main body 30 as the first sensor component and the housing 6 by press-fitting. The second fixing portion 20 fixes the sensor main body 30, which serves as a first sensor component, to the housing 6 by snap-fit. The press-fitting direction of the first fixing portion 10 and the snap-fit insertion direction of the second fixing portion 20 are aligned.

According to this configuration, when fixing the sensor main body 30 and the housing 6, it is possible to simultaneously perform press-fitting and fixing at the first fixing portion 10 and snap-fitting and fixing at the second fixing portion 20. Therefore, since it is possible to perform the press-fitting and fixing at the first fixing portion 10 and the snap-fitting and fixing at the second fixing portion 20 in a single process, the assembly process between the sensor main body 30 and the housing 6 can be simplified and manufacturing costs can be reduced.

As described above, the brake pedal device 2 mounted on a vehicle is subjected to various environmental stresses. In contrast, in the third embodiment, even if the press-fit portion serving as the first fixing portion 10 becomes loose due to such various environmental stresses, the sensor main body 30 and the housing 6 continue to be fixed by the snap fit serving as the second fixing portion 20. Conversely, even if the snap-fit shaft part 26 or claw part 27 constituting the second fixing portion 20 is damaged due to various environmental stresses, the sensor main body 30 and the housing 6 continue to be fixed by the first fixing portion 10. Therefore, the brake pedal device 2 of the third embodiment prevents the sensor main body 30 from falling off, thereby enabling the sensor device 1 to continue outputting the correct detection values to the ECU 3, thereby improving the safety of vehicle braking in the brake-by-wire system 5.

(2) In the third embodiment, the first fixing portion 10 is configured to fix the sensor main body 30 on the axis of rotation CL of the brake pedal 8 by partially pressing a plurality of protrusions 15 protruding radially inward from a portion of the inner wall of the hole portion 11 into the outer wall of the fitting protrusion 12.

As a result, compared to the full-circumference press-fitting as described in the first and second embodiments, the partial press-fitting of the third embodiment makes it possible to reduce the tension acting on the sensor main body 30 and the housing 6 and suppress the amount of deformation of the sensor main body 30 and the housing 6. Therefore, by preventing a large stress from acting on the sensor main body 30, the detection accuracy of the sensor device 1 can be improved.

FOURTH EMBODIMENT

A fourth embodiment will be described. The fourth embodiment is a modification of the third embodiment, and changes partially the configuration of the first fixing portion 10 compared to the third embodiment.

Figures 19, 20:
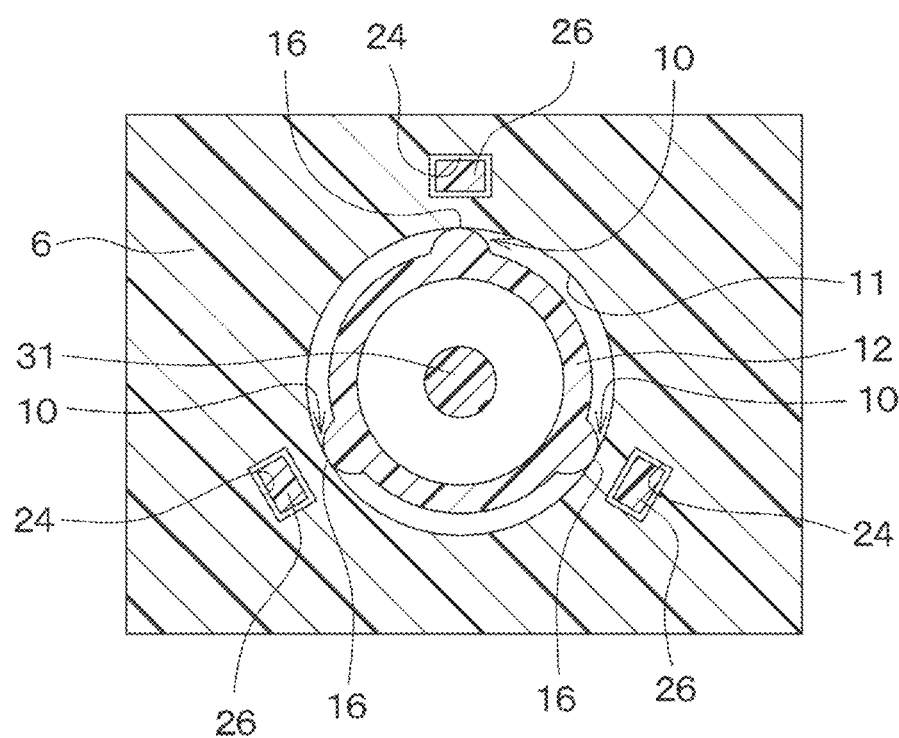
FIG. 19 is a cross-sectional view of a portion corresponding to FIG. 18 in a sensor device and a housing provided in a brake pedal device according to a fourth embodiment.
FIG. 20 is a cross-sectional view showing only a sensor device and a housing in a brake pedal device according to a fifth embodiment.

As shown in FIG. 19, in the fourth embodiment as well, the sensor main body 30 and the housing 6 of the sensor device 1 are fixed by the first fixing portion 10 and the second fixing portion 20. The press-fitting is adopted for the first fixing portion 10, and a snap fit is adopted for the second fixing portion 20.

The first fixing portion 10 fixes the sensor main body 30 and the housing 6 by partial press-fitting in which the inner wall of the hole portion 11 provided on the housing 6 and multiple protrusions 16 protruding radially from a portion of the outer wall of the fitting protrusion 12 provided on the sensor main body 30 fit together. At this time, the first fixing portion 10 fixes the sensor main body 30 and the housing 6 so that the sensor detection center of the sensor main body 30 coincides with the axis CL of the shaft 7. Although FIG. 19 shows three protrusions 16 protruding radially from a portion of the outer wall of the fitting protrusion 12, the number of protrusions 16 is not limited to this number and can be set arbitrarily.

The fourth embodiment described above can thus have the effect similar to that of the third embodiment.

FIFTH EMBODIMENT

A fifth embodiment will be described. In the fifth embodiment, a part of the configuration of the first fixing portion 10 is changed from the third and fourth embodiments.

Figure 21:
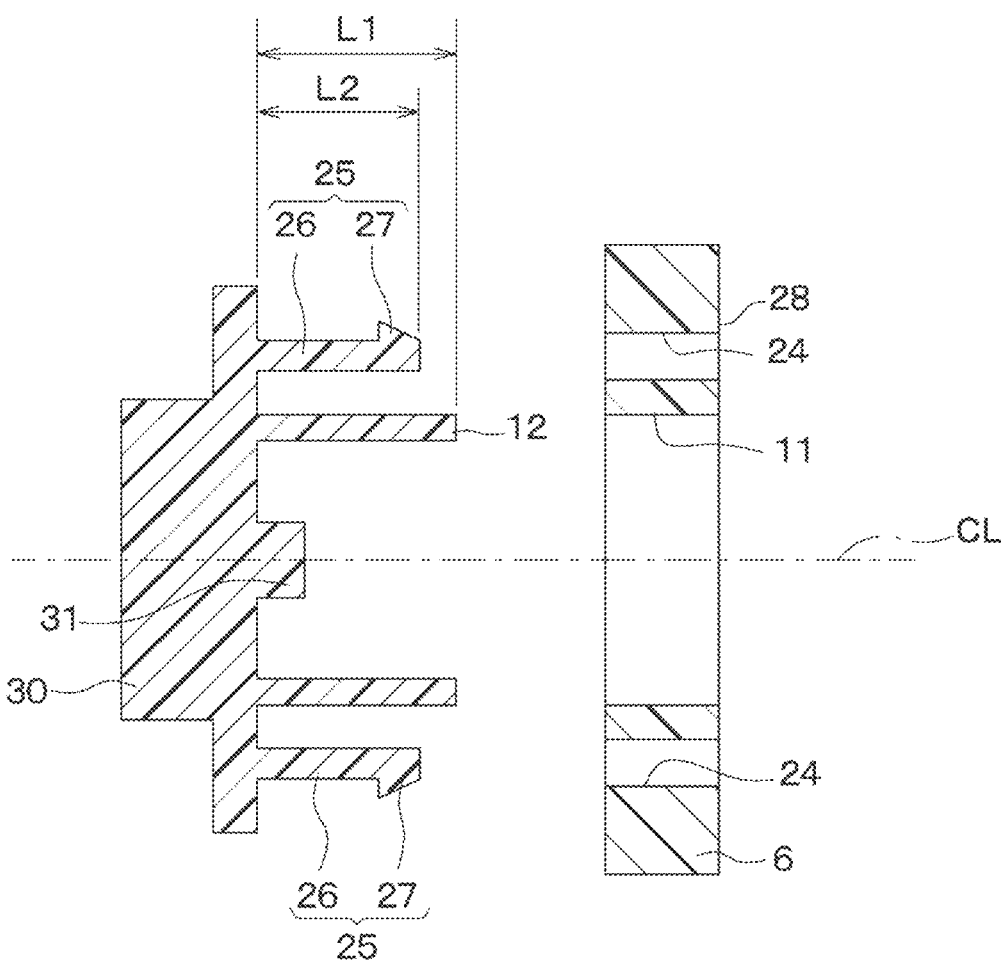
FIG. 21 is an exploded view of the sensor device and housing shown in FIG. 20.
Figure 22:
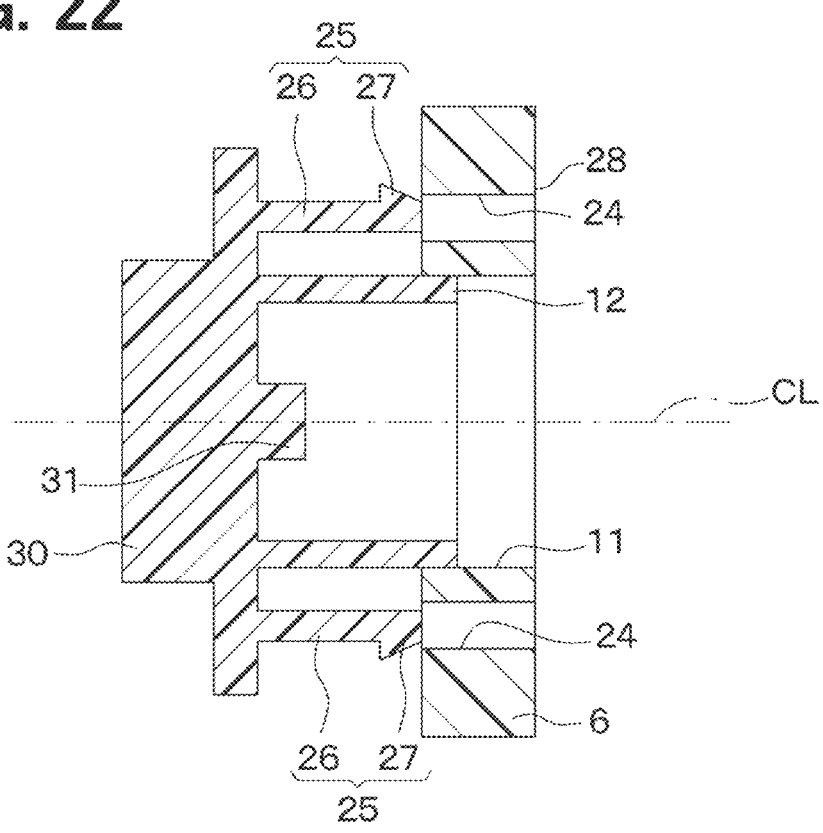
FIG. 22 is an explanatory diagram for explaining a method for fixing the sensor device to the housing.

As shown in FIGS. 20 to 22, in the fifth embodiment as well, the sensor main body 30 and the housing 6 of the sensor device 1 are fixed by the first fixing portion 10 and the second fixing portion 20. The press-fitting is adopted for the first fixing portion 10, and a snap fit is adopted for the second fixing portion 20.

The first fixing portion 10 fixes the sensor main body 30 to the housing 6 by press-fitting the inner wall of the hole portion 11 provided in the housing 6 into the outer wall of the fitting protrusion 12 provided on the sensor main body 30. At this time, the first fixing portion 10 fixes the sensor main body 30 and the housing 6 so that the sensor detection center of the sensor main body 30 coincides with the axis CL of the shaft 7. However, the present disclosure is not limited thereto, and the first fixing portion 10 may fix the sensor main body 30 and the housing 6 by partial press-fitting as described in the third and fourth embodiments.

On the other hand, the second fixing portion 20 is composed of a second hole portion 24 provided in the housing 6 and a snap fit portion 25 extending from the sensor main body 30. The snap fit portion 25 has a shaft part 26 and a claw part 27. The insertion direction in which the snap fit portion 25 constituting the second fixing portion 20 is inserted into the second hole portion 24 of the housing 6 is aligned with the press-fitting direction in which the fitting protrusion 12 constituting the first fixing portion 10 is pressed into the inside of the hole portion 11 of the housing 6.

Furthermore, as shown in FIG. 21, in the fifth embodiment, a length L1 in the press-fitting direction of the fitting protrusion 12 constituting the first fixing portion 10 is longer than a length L2 in the insertion direction of the snap fit portion 25 constituting the second fixing portion 20. As a result, as shown in FIG. 22, when the sensor main body 30 is assembled to the housing 6 during a manufacturing process, etc., the fitting protrusion 12 provided on the sensor main body 30 is first pressed into the hole portion 11 provided in the housing 6. As a result, the sensor detection center of the sensor main body 30 and the axis CL of the shaft 7 coincide with each other. Subsequently, as the sensor main body 30 is brought even closer to the housing 6, the snap fit portion 25 extending from the sensor main body 30 starts to be inserted into the second hole portion 24 provided in the housing 6. Then, the fitting protrusion 12 provided on the sensor main body 30 is press-fitted into the hole portion 11 provided on the housing 6, while at the same time, the snap-fit portion 25 is inserted into the second hole portion 24 provided on the housing 6. Then, as shown in FIG. 20, the surface of the sensor main body 30 facing the housing 6 is brought into contact with the surface of the housing 6 facing the sensor main body 30, thereby completing the press-fitting and fixing by the first fixing portion 10 and the snap-fitting and fixing by the second fixing portion 20.

In the fifth embodiment described above, the length L1 in the press-fitting direction of the fitting protrusion 12 constituting the first fixing portion 10 is longer than the length L2 in the insertion direction of the snap fit portion 25 constituting the second fixing portion 20.

According to this configuration, during a manufacturing process, etc., the work process of press-fitting the fitting protrusion 12 of the sensor main body 30 into the hole portion 11 in the housing 6 can be used as positioning when inserting the snap fit portion 25 into the second hole portion 24 of the housing 6. In other words, the work process of press-fitting the fitting protrusion 12 of the sensor main body 30 into the hole portion 11 of the housing 6 functions as a guide when inserting the snap-fit portion 25 into the second hole portion 24 of the housing 6. Therefore, according to the configuration of the fifth embodiment, it is not necessary to provide a separate positioning structure for inserting the snap-fit portion 25 into the second hole portion 24 of the housing 6, and manufacturing costs can be reduced.

SIXTH EMBODIMENT

A sixth embodiment will be described hereafter. In the sixth embodiment, the configurations of the first fixing portion 10 and the second fixing portion 20 are changed from the first embodiment. Since the other parts are similar to that in the first embodiment, only the different parts from the first embodiment will be described.

In the sixth embodiment as well, the sensor main body 30 and the housing 6 of the sensor device 1 are fixed by the first fixing portion 10 and the second fixing portion 20. The first fixing portion 10 is adopted for a screw fitting, and the second fixing portion 20 is adopted for the press fitting.

Figure 23:
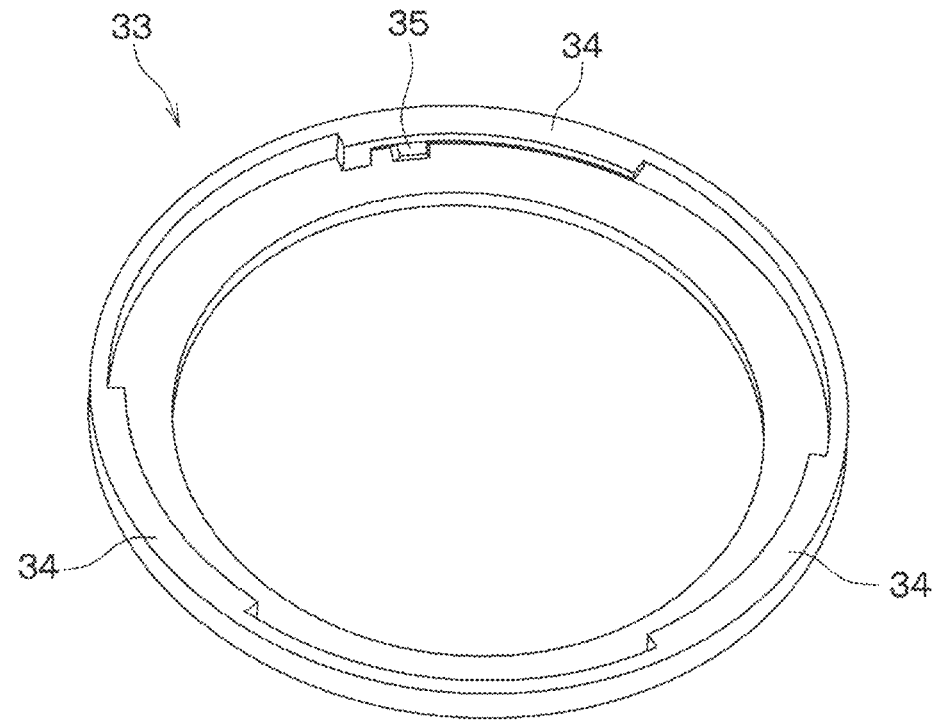
FIG. 23 is a perspective view showing a portion of a sensor device provided in a brake pedal device according to a sixth embodiment that is fixed to a housing.
Figure 24:
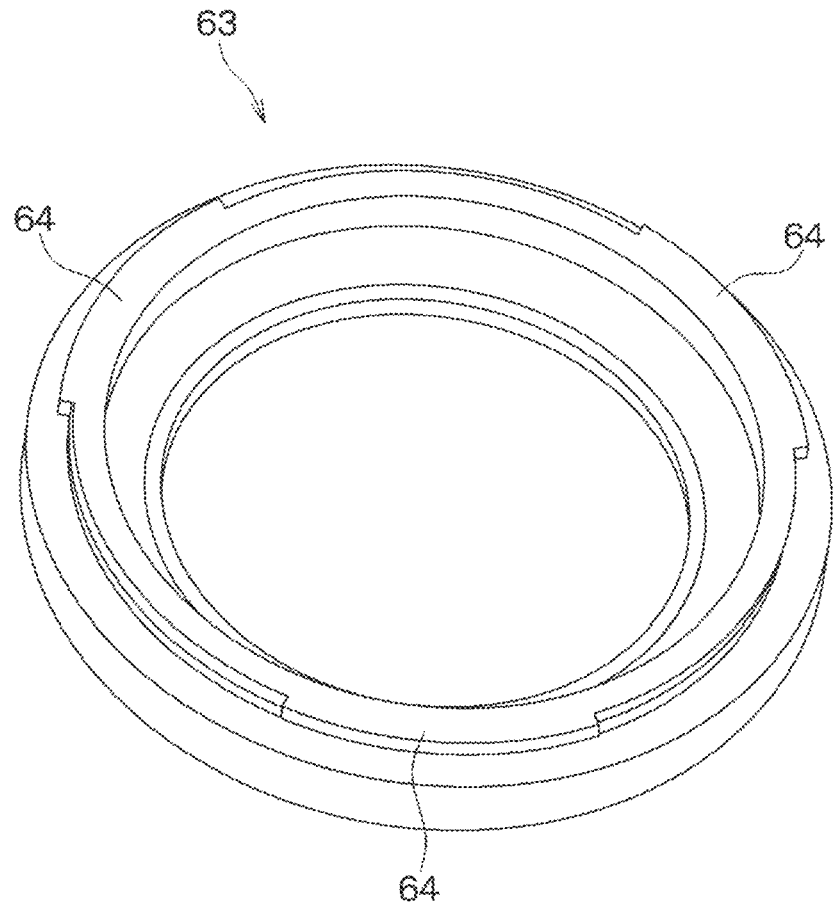
FIG. 24 is a perspective view showing a portion of a housing provided in a brake pedal device according to a sixth embodiment, to which a sensor device is fixed.

FIG. 23 is a perspective view showing only a portion of the sensor main body 30 of the sensor device 1 provided in the brake pedal device 2 of the sixth embodiment that is fixed to the housing 6 (hereinafter referred to as a "first portion 33"). FIG. 24 is a perspective view showing only a portion of the housing 6 of the brake pedal device 2 to which the sensor device 1 is fixed (hereinafter referred to as a "second portion 63").

By overlapping the first portion 33 and the second portion 63 coaxially and rotating them in the circumferential direction, the first portion 33 and the second portion 63 are fixed by screwing a flange part 34 of the first portion 33 and the flange part 64 of the second portion 63 together. Furthermore, when fixing by screwing, the press-fitting protrusion 35 provided on the first portion 33 presses the flange part 64 of the second portion 63, whereby the first portion 33 and the second portion 63 are fixed by press-fitting. That is, the flange parts 34, 64 provided on the first portion 33 and the second portion 63 respectively correspond to the first fixing portion 10 that performs the screw fixing, and the press-fitting protrusion 35 provided on the first portion 33 and the flange part 64 of the second portion 63 correspond to the second fixing portion 20 that performs the press-fitting and fixing.

Figure 25:
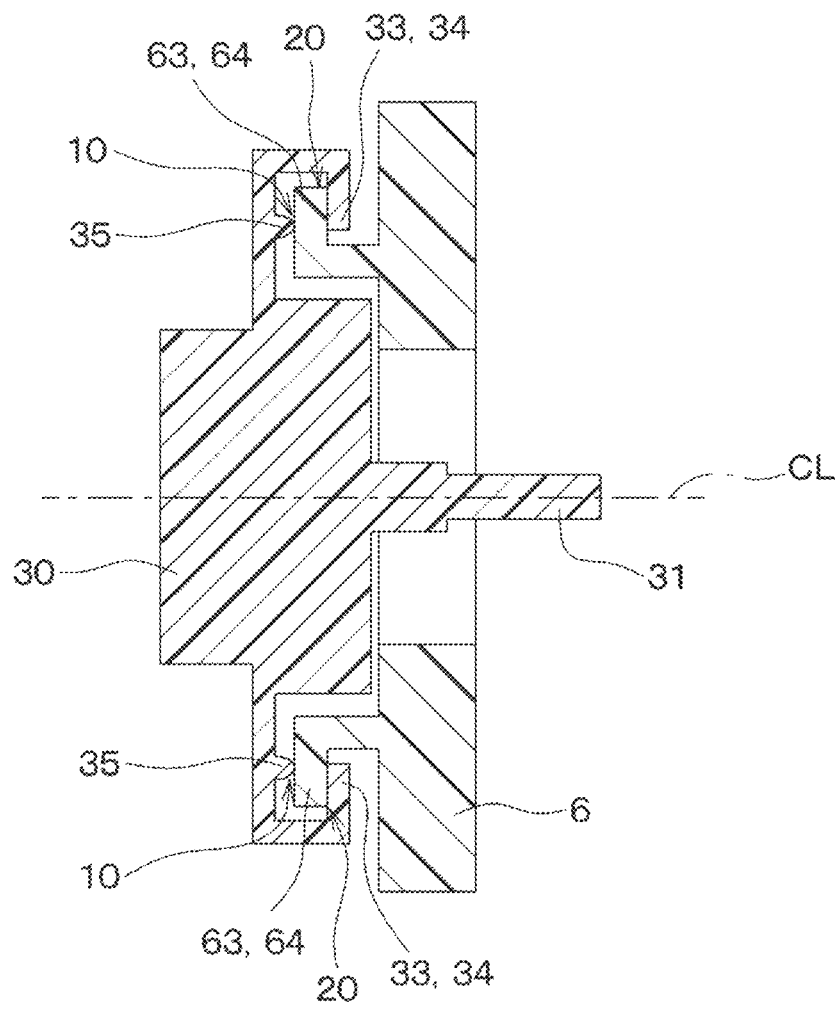
FIG. 25 is a cross-sectional view showing only a sensor device and a housing in a brake pedal device according to a sixth embodiment.

FIG. 25 is a cross-sectional view showing the sensor main 30 and the housing 6 in an assembled state. As shown in FIG. 25, a flange part 64 provided on the housing 6 and a flange part 34 provided on the sensor main body 30 are screwed together. Furthermore, the press-fitting protrusion 35 provided on the sensor main body 30 presses against the flange part 64 provided on the housing 6. In this manner, the sensor main body 30 and the housing 6 are fixed to each other. That is, the flange part 64 provided on the housing 6 and the flange part 34 of the sensor main body 30 that screws into the flange part 64 correspond to the first fixing portion 10. Further, the press-fitting protrusion 35 provided on the sensor main body 30 and the flange part 64 of the housing 6 pressed by the press-fitting protrusion 35 correspond to the second fixing portion 20.

The brake pedal device 2 of the sixth embodiment described above is configured such that the sensor main body 30 as a first sensor component constituting the sensor device 1 is fixed to the housing 6 by the first fixing portion 10 and the second fixing portion 20, which employ different fixing methods. This prevents the fixing function of the first fixing portion 10 and the fixing function of the second fixing portion 20 from failing simultaneously due to the same cause.

In the description of the sixth embodiment, the first portion 33 shown in FIG. 23 is provided on the sensor main body 30, and the second portion 63 shown in FIG. 24 is provided on the housing 6, but it is not limited to this configuration. For example, the first portion 33 shown in FIG. 23 may be provided on the housing 6, and the second portion 63 shown in FIG. 24 may be provided on the sensor main body 30.

SEVENTH EMBODIMENT

A seventh embodiment will be described. In the seventh embodiment, the configurations of the first fixing portion 10 and the second fixing portion 20 are changed from the first embodiment. Since the other parts are similar to that in the first embodiment, only the different parts from the first embodiment will be described.

Figure 26:
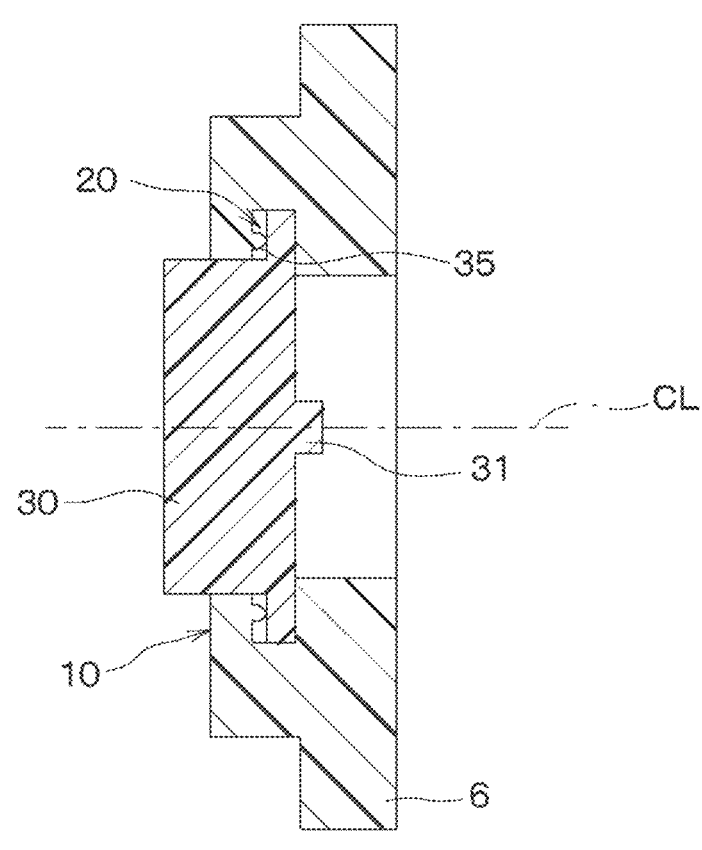
FIG. 26 is a cross-sectional view showing only a sensor device and a housing in a brake pedal device according to a seventh embodiment.

As shown in FIG. 26, in the seventh embodiment as well, the sensor main body 30 and the housing 6 of the sensor device 1 are fixed by the first fixing portion 10 and the second fixing portion 20. A welding or heat caulking is adopted for the first fixing portion 10, and the press-fitting is adopted for the second fixing portion 20. The position of the welding or heat caulking as the first fixing portion 10 and the position of the press-fitting protrusion 35 as the second fixing portion 20 can be set arbitrarily.

The brake pedal device 2 of the seventh embodiment described above is configured such that the sensor main body 30 as a first sensor component constituting the sensor device 1 is fixed to the housing 6 by the first fixing portion 10 and the second fixing portion 20, which employ different fixing methods. This prevents the fixing function of the first fixing portion 10 and the fixing function of the second fixing portion 20 from failing simultaneously due to the same cause.

EIGHTH EMBODIMENT

An eighth embodiment will be described. In the eighth embodiment, the configuration of the sensor device 1 is changed with respect to the first embodiment, and the other parts are similar to that in the first embodiment, so only the difference from the first embodiment will be described.

Figure 27:
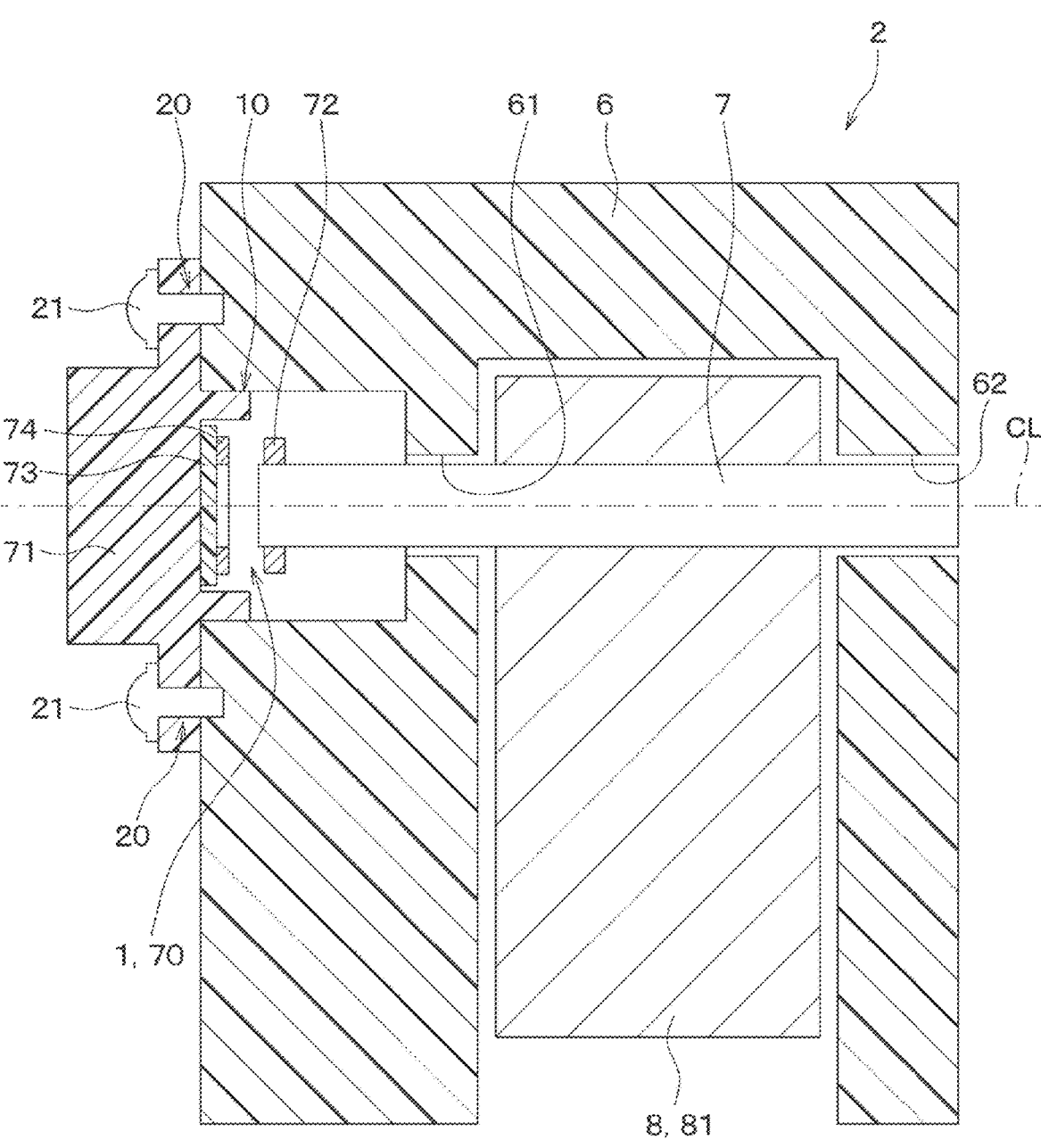
FIG. 27 is a cross-sectional view parallel to the axis of the shaft in a brake pedal device according to an eighth embodiment.

As shown in FIG. 27, the brake pedal device 2 of the eighth embodiment employs an inductive sensor 70 as the sensor device 1. The inductive sensor 70 utilizes the principle of mutual induction to detect the position (specifically, the rotation angle) of the detection target relative to the housing 6, and the detection target is the shaft 7 or the brake pedal 8. The inductive sensor 70 as an example of the sensor device 1 has a sensor main body 71 as a first sensor component, and a target 72 as a second sensor component.

The sensor main body 71 is fixed to the housing 6 by the first fixing portion 10 and a second fixing portion 20 which are different fixing methods. The fixing methods described in the first to seventh embodiments can be applied to the first fixing portion 10 and the second fixing portion 20. A circuit board 73 is fixed to the sensor main body 71, and a transmitting/receiving coil 74 (specifically, a transmitting coil and a receiving coil) and a transmitting/receiving circuit (not shown) are mounted on the circuit board 73. The transmitting coil is also called an excitation coil. FIG. 27 shows an area on the circuit board 73 where the transmitting/receiving coil 74 is mounted. The transmitting/receiving circuit is formed of an integrated circuit (IC) such as an ASIC, supplies high frequency waves to the transmitting coil, and outputs a signal according to the change in inductance of the receiving coil.

The target 72 is fixed to the end of the shaft 7 at a position facing the transmitting/receiving coil 74. The target 72 rotates in synchronization with the rotation of the shaft 7.

When the target 72 having a conductive material approaches the transmitting coil, the magnetic field of the transmitting coil is canceled and the amount of magnetic flux passing through the receiving coil changes, so the inductive sensor 70 is designed to read this change as an output. The output is a detection value corresponding to the angular position of the shaft 7 about its axis.

The eighth embodiment described above also has a configuration in which the sensor main body 71 as the first sensor component is fixed to the housing 6 by the first fixing portion 10 and the second fixing portion 20 using different fixing methods. This prevents the fixing function of the first fixing portion 10 and the fixing function of the second fixing portion 20 from failing simultaneously due to the same cause.

OTHER EMBODIMENTS (1) In each of the above embodiments, the brake pedal device 2 is a so-called pendant type in which, when installed in a vehicle, a part of the brake pedal 8 that is operated by the driver's foot is positioned below the axis CL of rotation in the direction of gravity. However, this brake pedal device 2 is not limited to this type. The brake pedal device 2 may be, for example, a so-called organ type in which, when mounted on a vehicle, the part of the brake pedal 8 operated by the driver's foot is disposed above the axis CL of rotation in the direction of gravity.

(2) In each of the above embodiments, the brake pedal device 2 is described as being used in a complete brake-by-wire system 5. However, the present disclosure is not limited to this configuration. The brake pedal device 2 can also be used in a brake-by-wire system 5 in which the components of the brake mechanism 4 are mechanically connected to the brake pedal 8 and the ECU 3 drives the brake mechanism 4 based on the output signal of the sensor device 1. The component of the brake mechanism 4 is, for example, a master cylinder.

(3) In each of the above embodiments, the brake pedal device 2 has been described as having a first fixing portion 10 and a second fixing portion 20 that fix the sensor components constituting at least a part of the sensor device 1 to the housing 6 or the brake pedal 8, but the present disclosure is not limited to this configuration. In addition to the first fixing portion 10 and the second fixing portion 20, the brake pedal device 2 may be provided with a third fixing portion or the like that fixes the sensor component to the housing 6 or the brake pedal 8 by a fixing method different from the first fixing portion 10 and the second fixing portion 20. That is, the sensor components may be fixed to the housing 6 or the brake pedal 8 using two or more different fixing methods.

The present disclosure is not limited to the above-described embodiments, and can be appropriately modified. The above-described embodiments and a part thereof are not irrelevant to each other, and can be appropriately combined with each other unless the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the embodiments described above, when referring to the shape, positional relationship, and the like of the components and the like, it is not limited to the shape, positional relationship, and the like, except for the case where the components are specifically specified, the case where the components are fundamentally limited to a specific shape, positional relationship, and the like.

Features of the present disclosure are shown below.

[An aspect 1 of the present disclosure]

A brake pedal device used in a brake-by-wire system (5) in which a brake mechanism (4) brakes a vehicle under drive control of an electronic control device (3) mounted on the vehicle includes:

a housing (6) fixed directly or indirectly to the vehicle;

a shaft (7) rotatably provided around a predetermined axis (CL) relative to the housing within a predetermined angle range;

a brake pedal (8) fixed to the shaft and configured to operate within a predetermined angle range around the axis;

a sensor device (1, 70) that outputs a signal detecting positions of the shaft and the brake pedal relative to the housing to the electronic control device;

a first fixing portion (10) that fixes a sensor component (30, 71) constituting at least a part of the sensor device to the housing or the brake pedal; and a second fixing portion (20) that fixes the sensor component and the housing or the brake pedal by a fixing method different from that of the first fixing portion.

[An aspect 2 of the present disclosure]

In the brake pedal device according to the aspect 1, the component of the brake mechanism that brakes the vehicle and the brake pedal are not mechanically connected, and the brake pedal device is used in a complete brake-by-wire system in which the electronic control device drives and controls the brake mechanism to brake the vehicle based on an output signal of the sensor device.

[An aspect 3 of the present disclosure]

In the brake pedal device according to the aspect 1 or 2, the first fixing portion is a portion that fixes the sensor component and the housing by press-fitting, the second fixing portion is a portion that fixes the sensor component and the housing by snap-fitting, and a press-fitting direction of the first fixing portion and a snap-fit insertion direction of the second fixing portion are aligned with each other.

[An aspect 4 of the present disclosure]

In the brake pedal device according to any one of aspects 1 to 3, the first fixing portion is configured to fix the sensor component on the axis by press-fitting with a spigot structure in which an outer wall of the fitting protrusion (12) provided on the sensor component fits inside a hole portion (11) provided on the housing, a center of the hole portion, a center of the fitting protrusion, and the axis are aligned with each other.

[An aspect 5 of the present disclosure]

In the brake pedal device according to any one of aspects 1 to 4, the first fixing portion is configured to fix the sensor component on the axis by press-fitting a plurality of protrusions (15) radially protruding from a part of an inner wall of the hole portion (11) provided in the housing and an outer wall of the fitting protrusion (12) provided in the sensor component, or by press-fitting a plurality of protrusions (16) radially protruding from a part of the outer wall of the fitting protrusion and the inner wall of the hole portion.

[An aspect 6 of the present disclosure]

In the brake pedal device according to any one of aspects 1 to 5, the first fixing portion is configured to fix the sensor component on the axis by press-fitting with a spigot structure in which an outer wall of the fitting protrusion (12) provided on the sensor component fits inside a hole portion (11) provided on the housing, the second fixing portion is configured to fix the housing and the sensor component by a second hole portion (24) formed in the housing, a shaft part (26) extending from the sensor component and passing through the second hole portion, and a claw part (27) provided at a tip of the shaft part and locked in an opening part (28) on an opposite side of the second hole portion from the sensor component, and a length of the fitting protrusion in the press-fitting direction is longer than the lengths of the shaft part and the claw part in the insertion direction.

[An aspect 7 of the present disclosure]

In the brake pedal device according to any one of aspects 1 to 6, the first fixing portion is configured to fix the sensor component on the axis by press-fitting the sensor component into an inner wall of a fitting hole portion (14) provided in the sensor component with an outer side of a fitting protrusion (13) provided in the housing, and a center of the fitting protrusion, a center of the fitting hole portion, and the axis are aligned.

What is claimed is:

1. A brake pedal device used in a brake-by-wire system in which a brake mechanism brakes a vehicle under drive control of an electronic control device mounted on the vehicle, the brake pedal device, comprising:

a housing fixed directly or indirectly to the vehicle;

a shaft rotatably provided around a predetermined axis relative to the housing within a predetermined angle range;

a brake pedal fixed to the shaft and configured to operate within a predetermined angle range around the axis;

a sensor device that outputs a signal detecting positions of the shaft and the brake pedal relative to the housing to the electronic control device;

a first fixing portion that fixes a sensor component constituting at least a part of the sensor device to the housing or the brake pedal; and a second fixing portion that fixes the sensor component and the housing or the brake pedal by a fixing method different from that of the first fixing portion, wherein the first fixing portion is configured to fix the sensor component on the axis by press-fitting a plurality of protrusions radially protruding from a part of an inner wall of a hole portion provided in the housing and an outer wall of a fitting protrusion provided in the sensor component, or by press-fitting a plurality of protrusions radially protruding from a part of the outer wall of the fitting protrusion and the inner wall of the hole portion.

2. The brake pedal device according to claim 1, wherein the component of the brake mechanism that brakes the vehicle and the brake pedal are not mechanically connected, and the brake pedal device is used in a complete brake-by-wire system in which the electronic control device drives and controls the brake mechanism to brake the vehicle based on an output signal of the sensor device.

* * * * *